United States Patent
Ikeya et al.

(10) Patent No.: US 9,286,796 B2
(45) Date of Patent: Mar. 15, 2016

(54) TRAFFIC FLOW MEASURING APPARATUS AND METHOD, AND COMPUTER-READABLE STORAGE MEDIUM FOR JUDGING SIZE OF VEHICLE DEPENDING ON NUMBER OF TIMES REFLECTED WAVE FROM VEHICLE IS DETECTED WITHIN DETECTION TIME

(71) Applicant: FUJITSU LIMITED, Kawasaki-shi, Kanagawa (JP)

(72) Inventors: Tomonori Ikeya, Sagamihara (JP); Kazuhiko Shite, Sagamihara (JP); Junko Kajiki, Kawasaki (JP); Mitsuru Ochi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/308,796

(22) Filed: Jun. 19, 2014

(65) Prior Publication Data
US 2015/0029042 A1  Jan. 29, 2015

(30) Foreign Application Priority Data
Jul. 24, 2013 (JP) ................................. 2013-153744

(51) Int. Cl.
*G08B 21/00* (2006.01)
*G08G 1/01* (2006.01)
*G01S 7/41* (2006.01)
(Continued)

(52) U.S. Cl.
CPC ............... *G08G 1/0125* (2013.01); *G01S 7/41* (2013.01); *G01S 13/345* (2013.01); *G01S 13/583* (2013.01); *G08G 1/015* (2013.01); *G08G 1/0116* (2013.01); *G08G 1/052* (2013.01); *G01S 7/354* (2013.01); *G08G 1/0129* (2013.01)

(58) Field of Classification Search
CPC .......... G01S 7/354; G01S 7/41; G08G 1/0116; G08G 1/0125; G08G 1/015
USPC .................................................. 340/933, 934
See application file for complete search history.

(56) References Cited

U.S. PATENT DOCUMENTS 5,529,138 A * 6/1996 Shaw ..................... B60K 23/08 180/169
5,884,212 A   3/1999 Lion
(Continued)

FOREIGN PATENT DOCUMENTS

| DE | 102012107444 B3 | 3/2013 |
| JP | 2011-017634 | 1/2011 |
| JP | 2011-257814 | 12/2011 |

OTHER PUBLICATIONS

Fang, Jianxin et al., "A Low-cost Vehicle Detection and Classification System based on Unmodulated Continuous-wave Radar", Intelligent Transportation Systems Conference, Sep. 30-Oct. 3, 2007, ITSC 2007, IEEE, PI, 1 pp. 715-720, XP031151484, with English Abstract.
(Continued)

*Primary Examiner* — Mark Rushing
(74) *Attorney, Agent, or Firm* — Fujitsu Patent Center

(57) ABSTRACT

A traffic flow measuring apparatus includes a processor configured to judge a size of a vehicle, depending on a detection frequency or a non-detection frequency of a reflected wave from the vehicle with respect to a transmission wave transmitted from a radar apparatus, within a detection time of the reflected wave from the vehicle, set according to the detection of the reflected wave.

20 Claims, 30 Drawing Sheets

(51) Int. Cl.
*G01S 13/34* (2006.01)
*G01S 13/58* (2006.01)
*G08G 1/015* (2006.01)
*G08G 1/052* (2006.01)
*G01S 7/35* (2006.01)

(56) References Cited

U.S. PATENT DOCUMENTS

| | | | | |
|---|---|---|---|---|
| 2003/0189499 | A1* | 10/2003 | Stricklin et al. | 340/933 |
| 2005/0105773 | A1* | 5/2005 | Saito et al. | 382/104 |
| 2007/0008184 | A1* | 1/2007 | Ho et al. | 340/941 |
| 2011/0006941 | A1 | 1/2011 | Samukawa et al. | |
| 2011/0137562 | A1* | 6/2011 | Taguchi | 701/301 |
| 2014/0049419 | A1 | 2/2014 | Lehning | |

OTHER PUBLICATIONS

Extended European Search Report dated Dec. 4, 2014 for corresponding European Patent Application No. 14172939.2, 6 pages.

Korean Office Action mailed on Aug. 25, 2015 for corresponding Korean Patent Application No. 10-2014-0083819, with English Translation, 7 pages.

* cited by examiner

FIG.20

| B1m(m) / Dr(%) | 30 | 29.5 | 29 | 28.5 | 28 | 27.5 | 27 | 26.5 | 26 | 25.5 | 25 | 24.5 | 24 | 23.5 | 23 | 22.5 | 22 | 21.5 | 21 | 20.5 | 20 |
|---|---|---|---|---|---|---|---|---|---|---|---|---|---|---|---|---|---|---|---|---|---|
| 80 | 2 | 2 | 2 | 3 | 3 | 2 | 3 | 2 | 3 | 3 | 3 | 3 | 3 | 3 | 3 | 2 | 3 | 3 | 4 | 4 | 4 |
| 75 | 3 | 4 | 5 | 5 | 6 | 6 | 6 | 5 | 5 | 3 | 4 | 3 | 3 | 3 | 3 | 3 | 3 | 4 | 4 | 6 | 4 |
| 70 | 6 | 8 | 9 | 10 | 8 | 8 | 7 | 7 | 8 | 6 | 8 | 5 | 5 | 3 | 3 | 3 | 4 | 4 | 4 | 6 | 4 |
| 65 | 10 | 10 | 10 | 11 | 11 | 11 | 12 | 12 | 10 | 10 | 11 | 8 | 8 | 4 | 4 | 4 | 5 | 4 | 4 | 6 | 4 |
| 60 | 14 | 17 | 17 | 14 | 14 | 14 | 16 | 15 | 14 | 12 | 12 | 12 | 10 | 9 | 7 | 7 | 5 | 5 | 5 | 6 | 5 |
| 55 | 19 | 17 | 17 | 21 | 21 | 20 | 18 | 16 | 16 | 17 | 16 | 13 | 12 | 11 | 11 | 8 | 5 | 5 | 7 | 7 | 5 |
| 50 | 21 | 26 | 23 | 24 | 24 | 24 | 21 | 21 | 20 | 20 | 19 | 17 | 15 | 16 | 12 | 11 | 6 | 6 | 7 | 7 | 7 |
| 45 | 29 | 31 | 31 | 27 | 28 | 28 | 26 | 23 | 21 | 22 | 19 | 18 | 16 | 16 | 14 | 12 | 7 | 6 | 7 | 7 | 7 |
| 40 | 36 | 38 | 35 | 34 | 32 | 31 | 31 | 26 | 26 | 24 | 21 | 20 | 20 | 16 | 15 | 13 | 10 | 8 | 7 | 8 | 7 |
| 35 | 41 | 42 | 41 | 40 | 38 | 37 | 36 | 33 | 30 | 27 | 26 | 22 | 22 | 20 | 17 | 15 | 14 | 8 | 7 | 8 | 8 |
| 30 | 46 | 47 | 45 | 45 | 43 | 41 | 40 | 38 | 35 | 33 | 33 | 28 | 25 | 23 | 20 | 16 | 15 | 10 | 7 | 9 | 8 |
| 25 | 50 | 50 | 49 | 47 | 48 | 47 | 45 | 43 | 43 | 39 | 36 | 34 | 30 | 25 | 24 | 22 | 16 | 14 | 9 | 9 | 8 |
| 20 | 52 | 53 | 53 | 53 | 51 | 51 | 48 | 48 | 45 | 43 | 41 | 36 | 34 | 28 | 28 | 23 | 17 | 15 | 11 | 9 | 8 |
| 15 | 72 | 72 | 72 | 72 | 72 | 72 | 72 | 72 | 72 | 72 | 72 | 72 | 72 | 72 | 72 | 72 | 72 | 72 | 72 | 72 | 72 |

| B1m(m) / Dr(%) | 30 | 29.5 | 29 | 28.5 | 28 | 27.5 | 27 | 26.5 | 26 | 25.5 | 25 | 24.5 | 24 | 23.5 | 23 | 22.5 | 22 | 21.5 | 21 | 20.5 | 20 |
|---|---|---|---|---|---|---|---|---|---|---|---|---|---|---|---|---|---|---|---|---|---|
| 80 | 3 | 3 | 4 | 6 | 6 | 6 | 7 | 8 | 8 | 8 | 8 | 8 | 7 | 7 | 7 | 9 | 8 | 8 | 8 | 4 | 4 |
| 75 | 4 | 5 | 9 | 8 | 7 | 8 | 9 | 9 | 10 | 10 | 10 | 9 | 8 | 9 | 8 | 10 | 11 | 8 | 8 | 6 | 4 |
| 70 | 13 | 14 | 13 | 12 | 13 | 16 | 13 | 13 | 12 | 11 | 12 | 10 | 11 | 9 | 10 | 10 | 11 | 8 | 9 | 6 | 4 |
| 65 | 18 | 19 | 17 | 18 | 17 | 16 | 18 | 17 | 14 | 15 | 14 | 11 | 11 | 12 | 10 | 10 | 11 | 10 | 9 | 6 | 5 |
| 60 | 20 | 20 | 21 | 20 | 20 | 22 | 20 | 18 | 17 | 18 | 16 | 16 | 14 | 13 | 12 | 11 | 11 | 10 | 9 | 7 | 5 |
| 55 | 26 | 24 | 22 | 25 | 24 | 23 | 22 | 22 | 20 | 18 | 18 | 17 | 16 | 14 | 13 | 13 | 11 | 10 | 9 | 7 | 5 |
| 50 | 29 | 31 | 31 | 29 | 28 | 27 | 28 | 24 | 23 | 23 | 19 | 18 | 18 | 15 | 14 | 14 | 13 | 11 | 9 | 8 | 7 |
| 45 | 33 | 33 | 33 | 31 | 30 | 30 | 29 | 27 | 25 | 24 | 22 | 20 | 19 | 16 | 14 | 14 | 13 | 11 | 10 | 8 | 7 |
| 40 | 34 | 34 | 35 | 35 | 35 | 33 | 30 | 30 | 28 | 27 | 26 | 24 | 22 | 19 | 15 | 16 | 13 | 11 | 11 | 9 | 7 |
| 35 | 36 | 36 | 36 | 36 | 36 | 36 | 34 | 33 | 33 | 30 | 27 | 26 | 26 | 22 | 21 | 17 | 15 | 12 | 11 | 9 | 7 |
| 30 | 38 | 37 | 38 | 37 | 36 | 37 | 36 | 37 | 37 | 33 | 30 | 28 | 27 | 25 | 23 | 22 | 15 | 13 | 11 | 9 | 7 |
| 25 | 41 | 40 | 39 | 38 | 40 | 39 | 39 | 39 | 37 | 36 | 35 | 30 | 29 | 27 | 25 | 23 | 17 | 15 | 12 | 10 | 9 |
| 20 | 43 | 43 | 43 | 43 | 43 | 43 | 41 | 41 | 41 | 40 | 35 | 33 | 30 | 29 | 26 | 24 | 20 | 16 | 15 | 12 | 10 |
| 15 | 55 | 55 | 55 | 55 | 55 | 55 | 55 | 55 | 55 | 55 | 55 | 55 | 55 | 55 | 55 | 55 | 55 | 55 | 55 | 55 | 55 |

| B1m(m) \ Dr(%) | 30 | 29.5 | 29 | 28.5 | 28 | 27.5 | 27 | 26.5 | 26 | 25.5 | 25 | 24.5 | 24 | 23.5 | 23 | 22.5 | 22 | 21.5 | 21 | 20.5 | 20 |
|---|---|---|---|---|---|---|---|---|---|---|---|---|---|---|---|---|---|---|---|---|---|
| 80 | 3 | 3 | 3 | 3 | 3 | 3 | 2 | 3 | 4 | 4 | 3 | 4 | 4 | 5 | 5 | 6 | 6 | 7 | 7 | 6 | 6 |
| 75 | 4 | 4 | 3 | 3 | 3 | 4 | 4 | 6 | 6 | 6 | 5 | 5 | 4 | 5 | 6 | 6 | 8 | 8 | 7 | 7 | 6 |
| 70 | 6 | 6 | 6 | 7 | 6 | 6 | 6 | 6 | 6 | 6 | 7 | 6 | 5 | 6 | 6 | 6 | 9 | 9 | 7 | 7 | 6 |
| 65 | 10 | 10 | 10 | 10 | 10 | 10 | 8 | 9 | 6 | 7 | 7 | 7 | 8 | 8 | 7 | 8 | 9 | 9 | 7 | 7 | 8 |
| 60 | 18 | 16 | 15 | 16 | 14 | 12 | 14 | 13 | 11 | 11 | 11 | 10 | 8 | 8 | 10 | 9 | 9 | 9 | 8 | 7 | 8 |
| 55 | 23 | 22 | 20 | 21 | 19 | 18 | 17 | 17 | 16 | 17 | 16 | 13 | 11 | 11 | 10 | 9 | 10 | 9 | 9 | 7 | 8 |
| 50 | 27 | 28 | 28 | 25 | 25 | 24 | 24 | 22 | 21 | 19 | 17 | 17 | 15 | 14 | 13 | 11 | 10 | 10 | 11 | 9 | 9 |
| 45 | 31 | 30 | 30 | 32 | 30 | 29 | 27 | 25 | 28 | 20 | 21 | 18 | 19 | 16 | 15 | 13 | 11 | 11 | 11 | 9 | 9 |
| 40 | 33 | 34 | 35 | 34 | 35 | 32 | 29 | 28 | 28 | 28 | 23 | 22 | 19 | 18 | 15 | 15 | 15 | 11 | 11 | 11 | 9 |
| 35 | 36 | 38 | 39 | 38 | 36 | 35 | 37 | 33 | 33 | 30 | 29 | 25 | 22 | 21 | 17 | 16 | 15 | 13 | 12 | 11 | 10 |
| 30 | 41 | 41 | 40 | 41 | 40 | 39 | 37 | 40 | 35 | 33 | 33 | 32 | 27 | 24 | 21 | 16 | 16 | 15 | 14 | 11 | 10 |
| 25 | 44 | 44 | 42 | 41 | 44 | 44 | 43 | 42 | 42 | 35 | 35 | 35 | 30 | 31 | 23 | 21 | 17 | 17 | 14 | 11 | 10 |
| 20 | 51 | 50 | 51 | 50 | 49 | 47 | 45 | 43 | 42 | 41 | 37 | 36 | 35 | 31 | 27 | 24 | 19 | 17 | 17 | 11 | 10 |
| 15 | 68 | 68 | 68 | 68 | 68 | 68 | 68 | 68 | 68 | 68 | 68 | 68 | 68 | 68 | 68 | 68 | 68 | 68 | 68 | 68 | 68 |

AL3-1
AL3-2

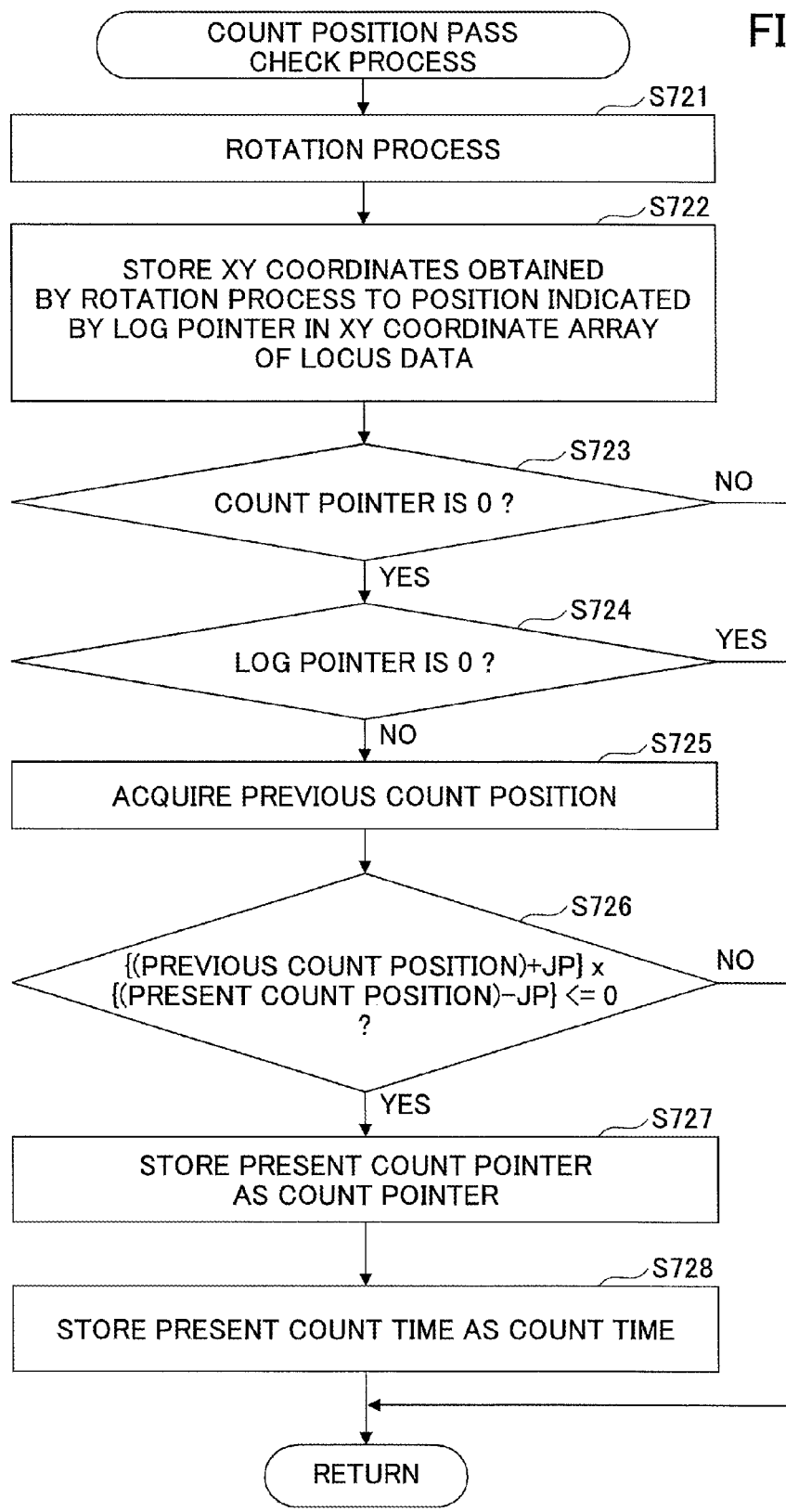

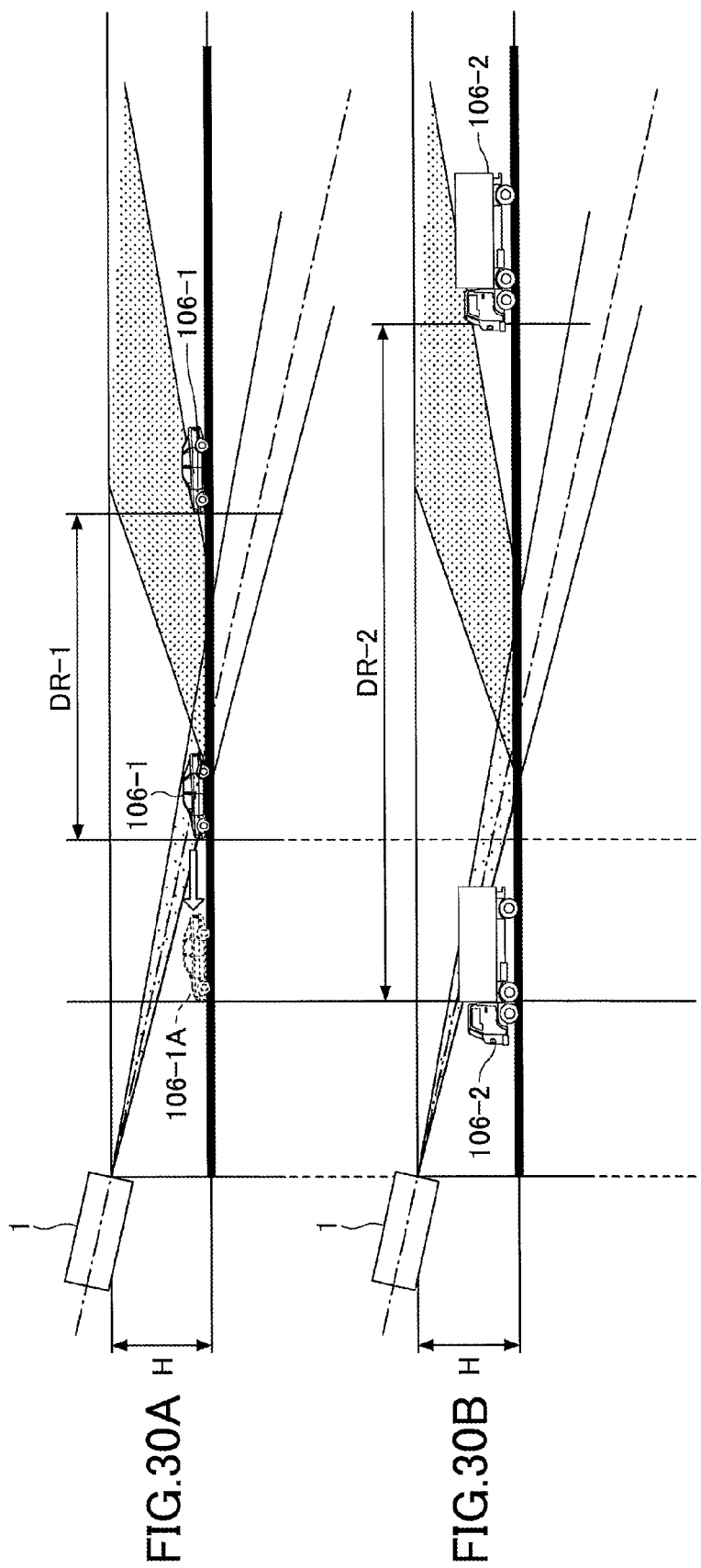

TRAFFIC FLOW MEASURING APPARATUS AND METHOD, AND COMPUTER-READABLE STORAGE MEDIUM FOR JUDGING SIZE OF VEHICLE DEPENDING ON NUMBER OF TIMES REFLECTED WAVE FROM VEHICLE IS DETECTED WITHIN DETECTION TIME

CROSS-REFERENCE TO RELATED APPLICATIONS

This application is based upon and claims the benefit of priority of the prior Japanese Patent Application No. 2013-153744, filed on Jul. 24, 2013, the entire contents of which are incorporated herein by reference.

FIELD

The embodiments discussed herein are related to a traffic flow measuring apparatus, a traffic flow measuring method, and a computer-readable storage medium.

BACKGROUND

A traffic monitoring system monitors a flow of vehicles (hereinafter referred to as "traffic flow") traveling on a road. In the traffic monitoring system that uses sensor units such as loop coils, ultrasonic sensors, or the like, two or more sensor units are provided at different positions in order to measure a number and a velocity of the vehicles traveling on the road. By measuring times at which a vehicle passes two sensor units that are separated by a predetermined distance along a traveling direction of the vehicle, for example, an average velocity of the vehicle between the two sensor units can be obtained.

On the other hand, a traffic monitoring system that uses a scan type radar apparatus to detect the vehicles has also been proposed. For example, a FM-CW (Frequency Modulated-Continuous Wave) radar apparatus periodically changes a transmission wave frequency and continuous transmitting the transmission wave without a break. Because the frequency of the transmission wave is already changed by the time a reflected wave from a detection target is received, a difference between the frequencies of the transmission wave and the received reflected wave may be measured to measure a time delay of the reflected wave, in order to detect a distance from the single FM-CW radar apparatus to the detection target and a moving velocity of the detection target. For this reason, by using the FM-CW radar apparatus in the traffic monitoring apparatus and detecting the number and the velocity of the vehicles traveling in each lane of the road monitored by the FM-CW radar apparatus, it is possible to grasp the traffic (or degree of traffic jam) in each lane of the road, and detect foreign objects such as trash existing on each lane.

In a case in which a size of the traveling vehicle traveling is to be included in the information measured by the traffic monitoring system, and the sensor units such as the ultrasonic sensors described above are to be used, the configuration of the traffic monitoring system becomes complex because two or more sensor units need to be provided. On the other hand, in a case in which the radar apparatus is used for the traffic monitoring system, another apparatus or means needs to be provided separately in order to measure the size of the traveling vehicle because it is difficult to measure the size of the traveling vehicle by the radar apparatus. In this case, the configuration of the traffic monitoring system becomes complex due to the need to separately provide the apparatus or means for measuring the size of the traveling vehicle.

It is possible to measure the size of the traveling vehicle from an image picked up by a camera. However, because the size of the vehicle within the picked up image changes depending on the distance from the camera to the vehicle, another apparatus or means needs to be provided separately in order to measure the distance to the traveling vehicle. In this case, the configuration of the traffic monitoring system becomes complex due to the need to separately provide the apparatus or means for measuring the distance to the traveling vehicle.

Examples of conventional systems are described in Japanese Laid-Open Patent Publications No. 2011-257814 and No. 2011-017634, for example.

According to the conventional systems or techniques, it is difficult to measure the size of the traveling vehicle using a simple configuration.

SUMMARY

Accordingly, it is an object in one aspect of the embodiment to provide a traffic flow measuring apparatus, a traffic flow measuring method, and a computer-readable storage medium, which can measure the size of the vehicle using a simple configuration.

According to one aspect of the present invention, a traffic flow measuring apparatus includes a processor configured to judge a size of a vehicle, depending on a detection frequency or a non-detection frequency of a reflected wave from the vehicle with respect to a transmission wave transmitted from a radar apparatus, within a detection time of the reflected wave from the vehicle, set according to the detection of the reflected wave.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is a diagram illustrating a number of vehicles detected in a lane L1 within a detection range DR, together with a vehicle detection rate Dr (%), for B1m=30 m to 20 m;

FIG. 21 is a diagram illustrating a number of vehicles detected in a lane L2 within the detection range DR, together with the vehicle detection rate Dr (%), for B1m=30 m to 20 m;

FIG. 22 is a diagram illustrating a number of vehicles detected in a lane L3 within the detection range DR, together with the vehicle detection rate Dr (%), for B1m=30 m to 20 m;

FIG. 29 is a flow chart for explaining an example of a count position pass check process; and FIGS. 30A and 30B are diagram for explaining a difference between detection ranges of a standard-sized vehicle and a large-sized vehicle.

DESCRIPTION OF EMBODIMENTS

Preferred embodiments of the present invention will be described with reference to the accompanying drawings.

In one embodiment, a judgment related to a size of a vehicle may be performed, depending on a detection frequency or a non-detection frequency of a reflected wave from the vehicle with respect to a transmission wave transmitted from a radar apparatus set according to a detection of the reflected wave, within a detection time of the reflected wave from the vehicle.

An estimated position where the vehicle is likely to be detected after a predetermined time may be estimated based on a detected position of the vehicle detected from the reflected wave from the vehicle with respect to the transmission wave. The estimated position and the detected position may be stored in a distinguishable manner within a storage unit, in correspondence with the vehicle. In this case, the judgment related to the size of the vehicle may output a judgment result by judging whether the size of the vehicle is greater than a predetermined size, based on a proportion of the number of estimated positions stored in the storage unit with respect to a sum of the number of estimated positions and the number of detected positions stored in the storage unit in correspondence with the vehicle.

A description will now be given of the traffic flow measuring apparatus, the traffic flow measuring method, and the computer-readable storage medium in each embodiment according to the present invention.

Figure 1:
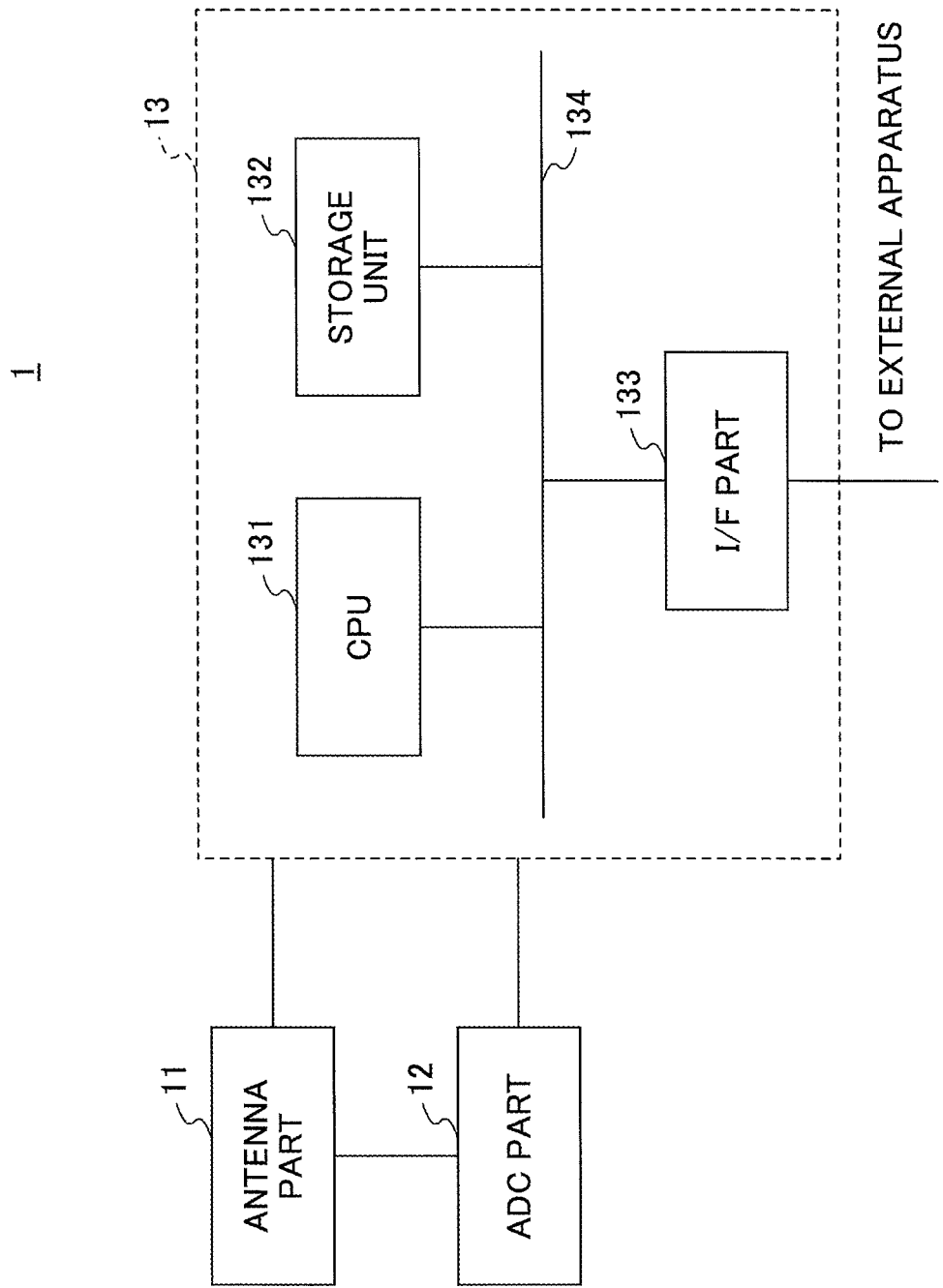
FIG. 1 is a block diagram illustrating an example of a hardware configuration of a traffic flow measuring apparatus in one embodiment.

FIG. 1 is a block diagram illustrating an example of a hardware configuration of a traffic flow measuring apparatus in one embodiment. A radar apparatus 1 may be formed by a FM-CW radar apparatus, for example. The radar apparatus 1 illustrated in FIG. 1 is an example of the traffic flow measuring apparatus, and includes an antenna part 11, an ADC (Analog-to-Digital Converter) part 12, and a signal processing part 13. The antenna part 11 transmits a transmission wave of a transmitting signal from the signal processing part 13 with respect to a scanning region that includes vehicles (not illustrated) traveling on a road, and receives a reflected wave from the vehicles or the like. The vehicle is an example of a detection target. The reflected wave received by the antenna part 11 is input to the signal processing part 13 after being converted into a digital signal by the ADC part 12.

The signal processing part 13 includes a CPU (Central Processing Unit) 131 that is an example of a processor, a storage unit 132, and an interface (I/F) part 133 that is an example of an interface means or unit providing an interface with respect to an external apparatus (not illustrated), that are connected via a bus 134. The connection of the CPU 131, the storage unit 132, and the I/F part 133 is not limited to a bus connection described above using the bus 134.

The CPU 131 controls the entire signal processing part 13, and may cause the signal processing part 13 to perform functions of the radar apparatus 1 by executing one or more programs. The storage unit 132 stores one or more programs executed by the CPU 131, and various data. The various data may include data used by the programs, computations, or the like executed by the CPU 131, intermediate data of the computations, data related to the vehicles (including measured data and detected data), and log data. The program may cause the CPU 131 to process the reflected wave received by the antenna part 11.

The storage unit 132 may be formed by one or a plurality of storage devices. The storage unit 132 may be formed by a non-transitory computer-readable storage medium. The non-transitory computer-readable storage medium may include a semiconductor memory device (or memory). In a case in which the non-transitory computer-readable storage medium is formed by a magnetic recording medium, an optical recording medium, a magneto-optical recording medium, or the like, the storage unit 132 may be formed by a reader and writer that reads information from and writes information to a recording medium that is loaded into the reader and writer.

The I/F part 133 can make a cable communication or a wireless communication with the external apparatus.

Figure 2:
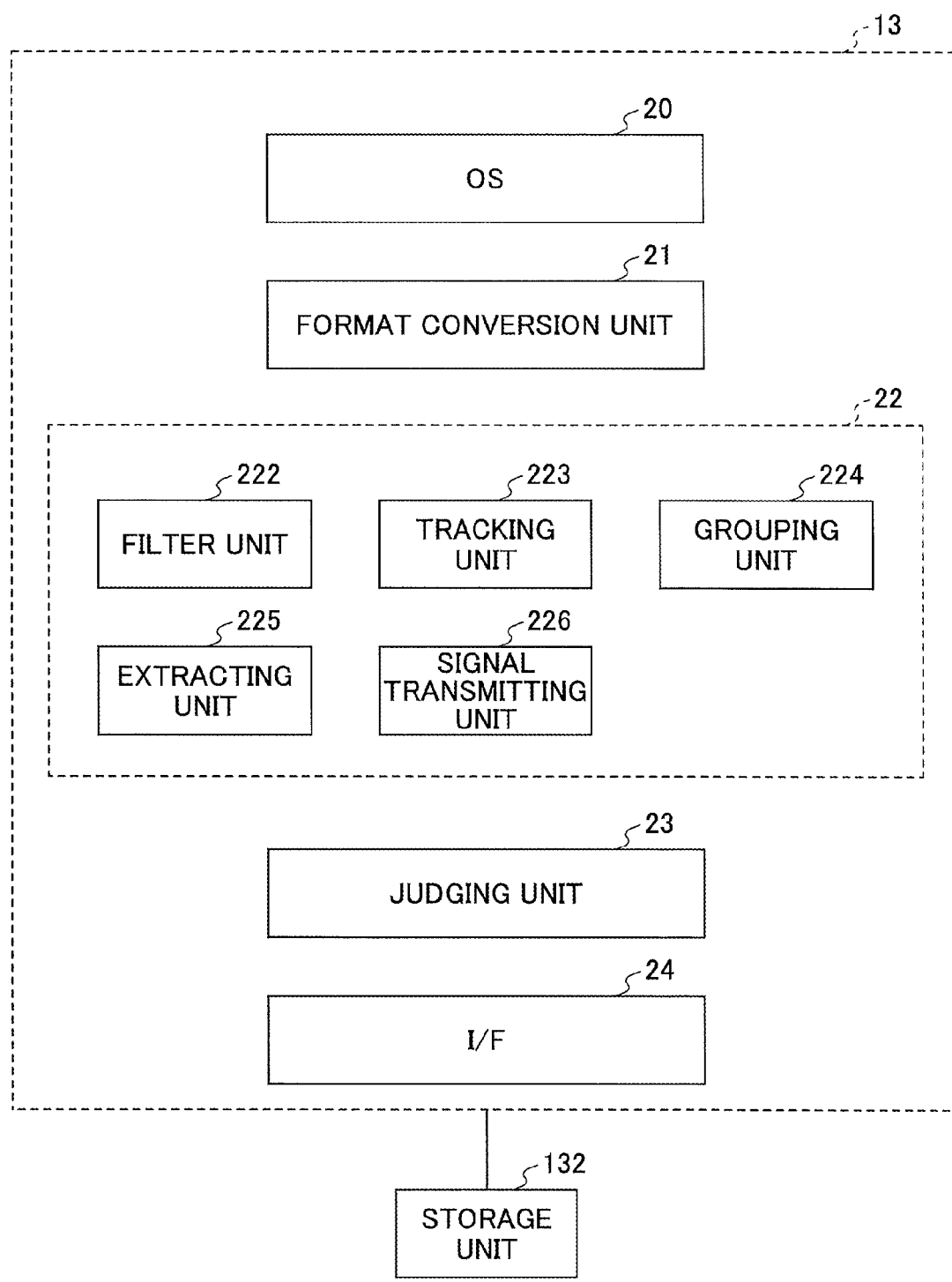
FIG. 2 is a block diagram illustrating an example of a software configuration of a radar apparatus in one embodiment.

FIG. 2 is a block diagram illustrating an example of a software configuration of the radar apparatus in one embodiment. The signal processing part 13 illustrated in FIG. 2 includes an OS (Operating System) 20, a format conversion unit 21, a radar firmware 22, a judging unit 23, and an interface (I/F) 24. The radar firmware 22 includes a filter unit 222, a tracking unit 223, a grouping unit 224, an extracting unit 225, and a signal transmitting unit 226. The CPU 131 may cause the signal processing unit 13 to perform functions of each of the units 21 through 24 of the signal processing part 13 by executing one or more programs. Each of the units 21 through 24 of the signal processing part 13 may perform the functions thereof, respectively, under control of the OS 21.

The reflected wave received by the antenna part 11 is converted into the digital signal by the ADC part 12 and input to the format conversion unit 21 via the I/F 24. The formal conversion unit 21 converts the digital signal input thereto into a signal having a format suited for the processing within the signal processing part 13, and the signal having the converted format is input to the radar firmware 22.

In the radar firmware 22, the signal transmitting unit 226 generates the transmitting signal by a known method and supplies the transmitting to the antenna part 11, in order to transmit the transmission wave from the antenna part 11.

The filter unit 222 performs a filter process on measured data (or detection results) of the vehicle generated by a known method, based on the reflected wave received via the antenna part 11 with respect to the transmission wave transmitted from the antenna part 11. In the case in which the radar apparatus 1 is formed by the FM-CW radar apparatus, the vehicle can be detected by pairing a difference between the transmission wave in a frequency rising interval and the reflected wave and a difference between the transmission wave in a frequency falling interval and the reflected wave. The generated measured data of the vehicle include parameters such as a distance from the radar apparatus 1 to the vehicle, an angle from a center of a scanning angular rage of the radar apparatus 1 to a position of the vehicle, for example, a velocity of the vehicle, and an intensity (or strength) of the reflected wave obtained from the vehicle, or the like. The parameters include the velocity of the vehicle, because a traveling direction of the vehicle can be detected based on whether the velocity of the vehicle has a positive value or a negative value. The filter process generates detection data obtained by narrowing down the measured data of the vehicles using threshold values set with respect to each of the parameters.

The tracking unit 223 performs a tracking process to confirm a continuity of the detection data of the generated detection data, and to judge the detection data having a high continuity higher than the threshold value set with respect to the continuity, as the detection data of the vehicle to be tracked, in order to reduce noise or the like. When the reflected wave from the vehicle traveling on the road is not received with respect to the transmission wave transmitted from the radar apparatus 1, the tracking unit 223 may function as an estimating means or unit to estimate an estimated position where the vehicle is likely to be detected after a predetermined time, and as a storing means or unit to store the estimated position and the detected position in a distinguishable manner within the storage unit 132 or within an external storage unit (not illustrated).

The grouping unit 224 performs a grouping process to group a plurality of vehicles having positions, velocities, or the like with differences less than a predetermined value, amongst the detection data of the vehicles, into one group by a known method, and to merge the detection data of the plurality of vehicles within one group.

The extracting unit 225 performs an extracting process to sort the detection data of the vehicles according to a predetermined condition with respect to the parameters, for example, and to assign a priority order to the sorted detection data. The extracting unit 225 extracts and outputs the detection data according to the priority order, starting from the detection data having a high priority order according to the number of data to be output, for example.

The filter unit 222, the tracking unit 223, the grouping unit 224, and the extracting unit 225 may form an example of a detecting means or unit to detect the vehicles based on the reflected wave with respect to the transmission wave and to output detection results. The detection data subjected to the processes of the filter unit 222, the tracking unit 223, the grouping unit 224, and the extracting unit 225 are stored in the storage unit 132. The detection data may be stored in the external storage unit (not illustrated) via the I/F 24.

The judging unit 23 may function as an example of a judging means or unit to perform a judging process based on the detection results output from the detection means or unit, and to output a judgment result. The judging process may be related to the size of the detected vehicle, or judge whether the size of the detected vehicle is greater than a predetermined size, as will be described later. More particularly, the first judging process may perform a judgment related to the size of the vehicle, depending on a detection frequency or a non-detection frequency of the reflected wave from the vehicle with respect to the transmission wave transmitted from the radar apparatus 1, within a detection time of the reflected wave from the vehicle, set according to the detection of the reflected wave. On the other hand, the latter judging process may perform a judgment related to the size of the vehicle and output a judgment result by judging whether the size of the vehicle is greater than a predetermined size, based on a proportion of the number of estimated positions stored in the storage unit 132 with respect to a sum of the number of estimated positions and the number of detected positions stored in the storage unit 132 in correspondence with the vehicle. The latter judging process may judge whether the size of the vehicle is greater than the predetermined size, based on a proportion of the estimated positions of the vehicles in a range in which the transmission wave from the radar apparatus 1 does not directly hit the road surface. The judging process performed by the judging unit 23 may include a process to count the number of traveling vehicles, or to judge a lane in which the vehicle travels, based on the detection results output from the detection means or unit.

The processes of the signal processing part 13 may of course be distributed and executed by the CPU 13 and a processor of the external apparatus that is communicable with the radar apparatus 1.

Figure 3:
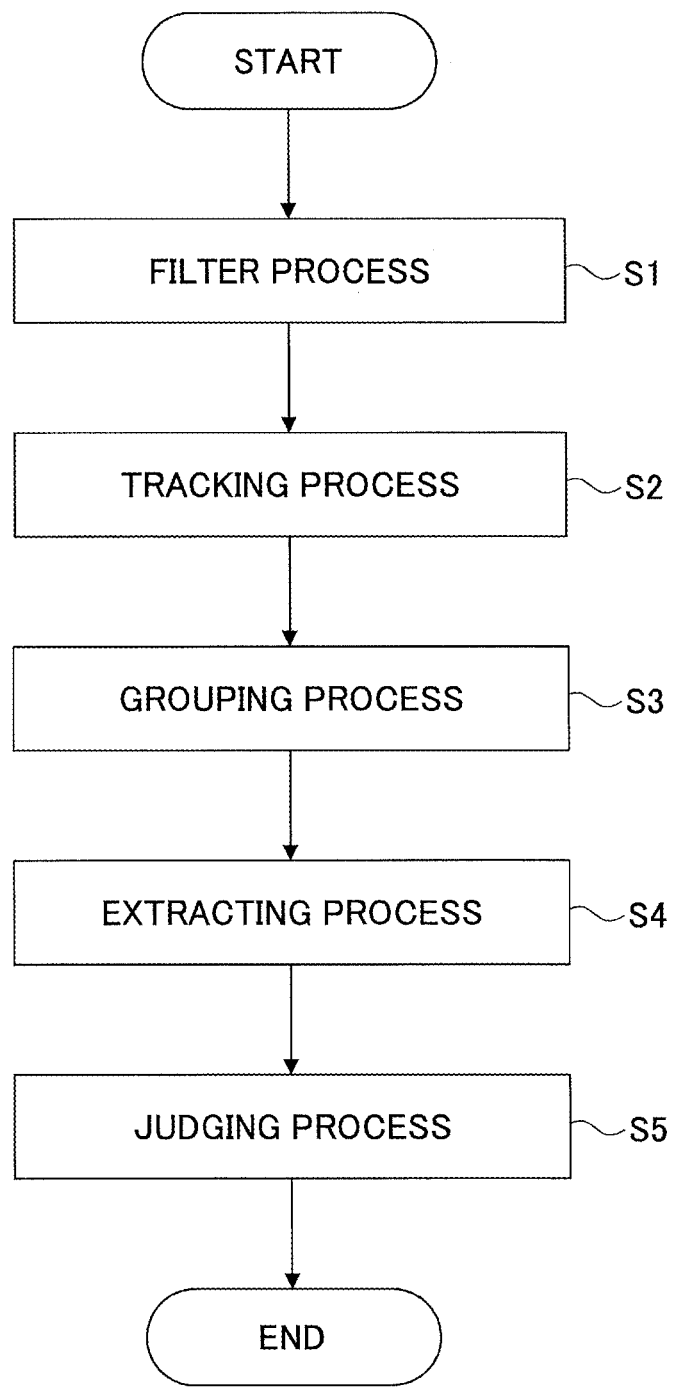
FIG. 3 is a flow chart for explaining an example of a process of the radar apparatus.

FIG. 3 is a flow chart for explaining an example of a process of the radar apparatus. It is assumed for the sake of convenience that the CPU 13 performs the process illustrated in FIG. 3. In FIG. 3, the filter unit 222 performs the filter process in step S1, and the tracking unit 223 performs the tracking process in step S2. The grouping unit 224 performs the grouping process in step S3, and the extracting unit 225 performs the extracting process in step S4. The judging unit 23 performs the judging process in step S5, and the process ends. The judgment result of the judging process may be output from the radar apparatus 1 to the external apparatus (not illustrated), for example, or may be displayed on a display unit (not illustrated). The order in which the processes of steps S2 and S3 are performed may be reversed, to perform the grouping process of step S3 before the tracking process of step S2.

Figure 4:
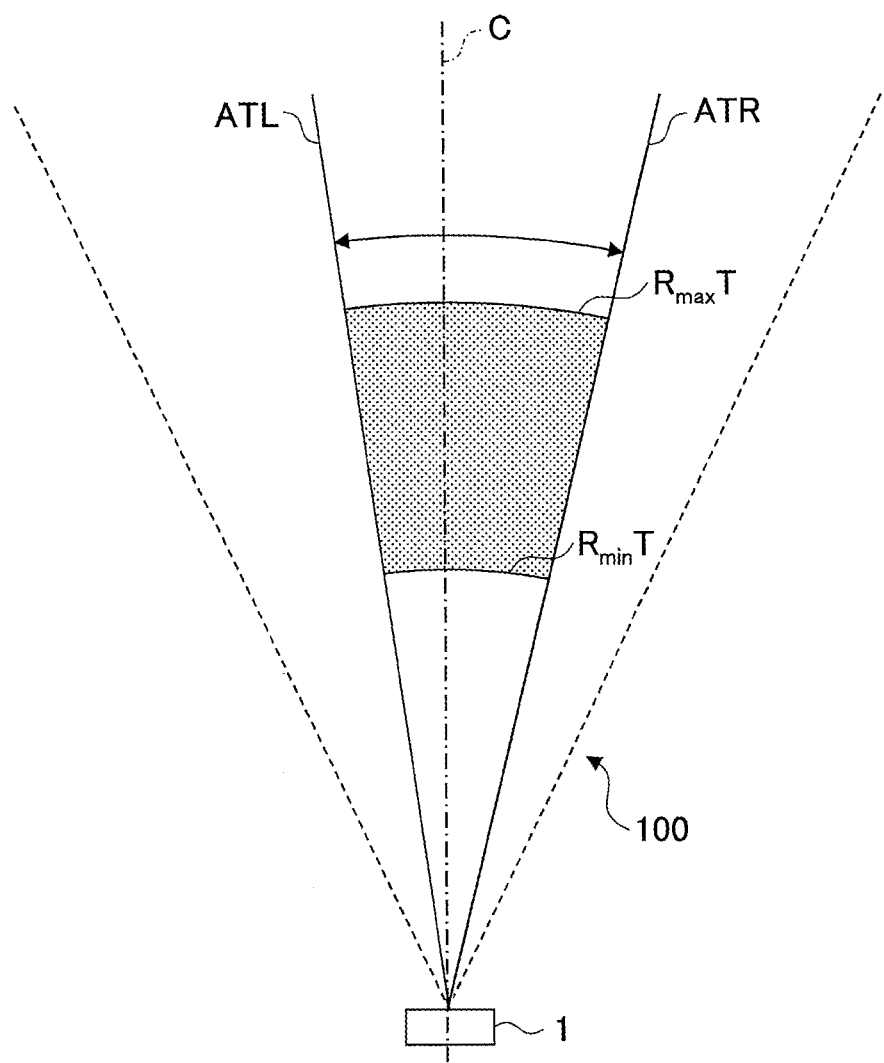
FIG. 4 is a diagram for explaining an example of a filter process using a distance to a vehicle and a threshold value of an angle from a center of a scanning angular range to a position of the vehicle.

A description will be given of an example of the filter process of step S1, by referring to FIGS. 4 and 5. FIG. 4 is a diagram for explaining an example of the filter process using a distance from the radar apparatus 1 to the vehicle and a threshold value of an angle from a center C of a scanning angular range 100 of the radar apparatus 1 to a position of the vehicle. In this example, the filter process narrows down the measured data of the vehicles to the detection data within the scanning angular range 100 illustrated in FIG. 4 and within a distance range between a maximum threshold value RmaxT and a minimum threshold value RminT of the distance. Further, the filter process narrows down the measured data of the vehicles to the detection data within the scanning angular range 100 illustrated in FIG. 4 and within an angular range between a minimum threshold value ATL of the angle in a leftward direction (or counterclockwise direction) from the center C and a maximum threshold value ATR of the angle in the rightward direction (or clockwise direction) from the center. In this example, the rightward direction (or clockwise direction) from the center C is regarded as a positive (or positive-valued) direction.

Figure 5:
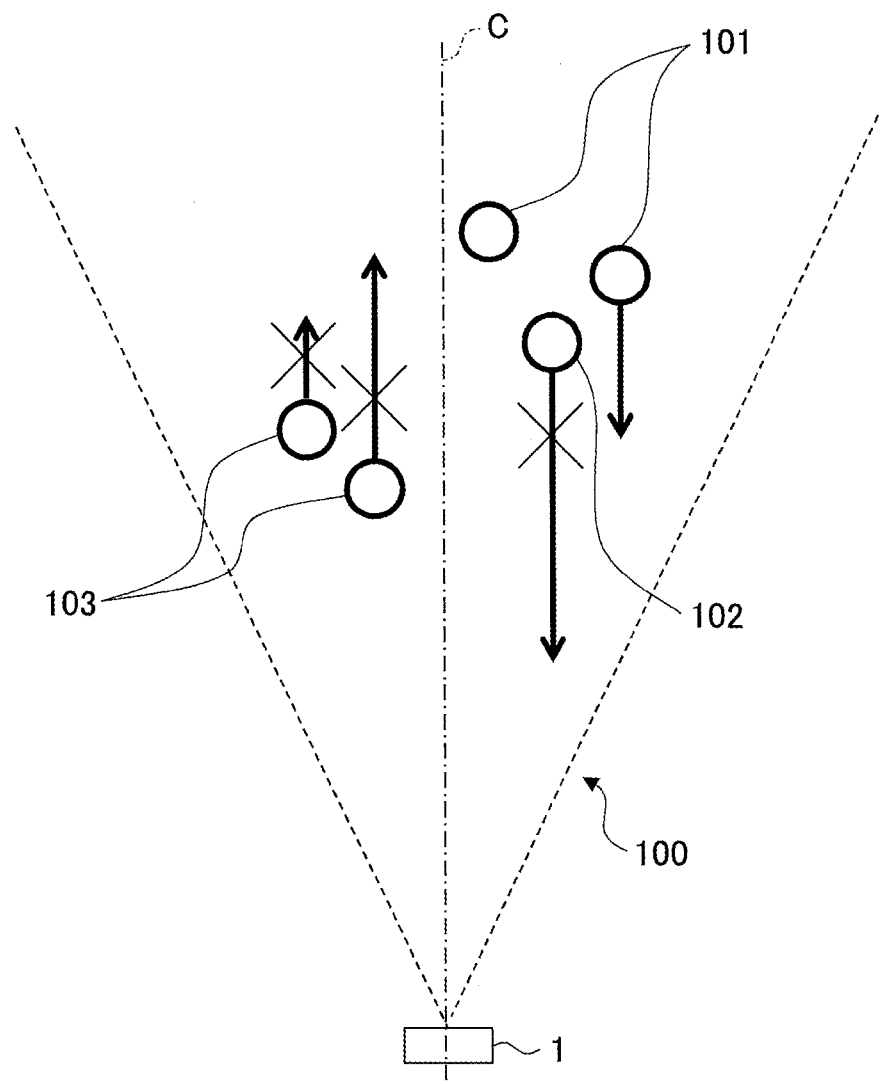
FIG. 5 is a diagram for explaining an example of the filter process using a traveling direction of the vehicle and a threshold value of a velocity.

FIG. 5 is a diagram for explaining an example of the filter process using a traveling direction of the vehicle and a threshold value of a velocity. In this example, the filter process narrows down the measured data of the vehicles to the detection data within the scanning angular range 100 illustrated in FIG. 5 and belonging to vehicles 101 having the traveling velocity less than or equal to a predetermined velocity and having the traveling direction in a downward direction. In this case, the detection data of vehicles 103 within the scanning angular range 100 and having the traveling direction in the downward direction but having the traveling direction exceeding the predetermined velocity, and the detection data of vehicles 103 within the scanning angular range 100 and having the traveling velocity less than or equal to the predetermined velocity but having the traveling direction in an upward direction (or direction other than the downward direction), are excluded.

Figure 6:
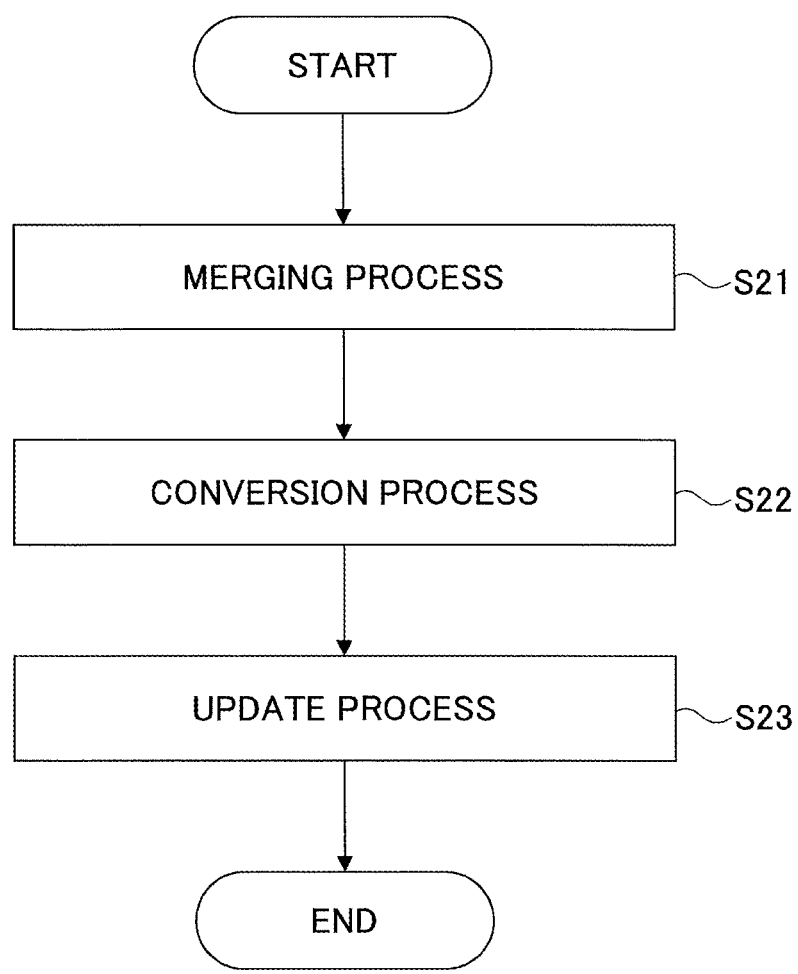
FIG. 6 is a flow chart for explaining an example of a tracking process.

FIG. 6 is a flow chart for explaining an example of the tracking process. In FIG. 6, the tracking unit 223 performs a merging process in step S21, and performs a conversion process in step S22. The tracking unit 223 performs an update process in step S23, and the process ends.

Figure 7:
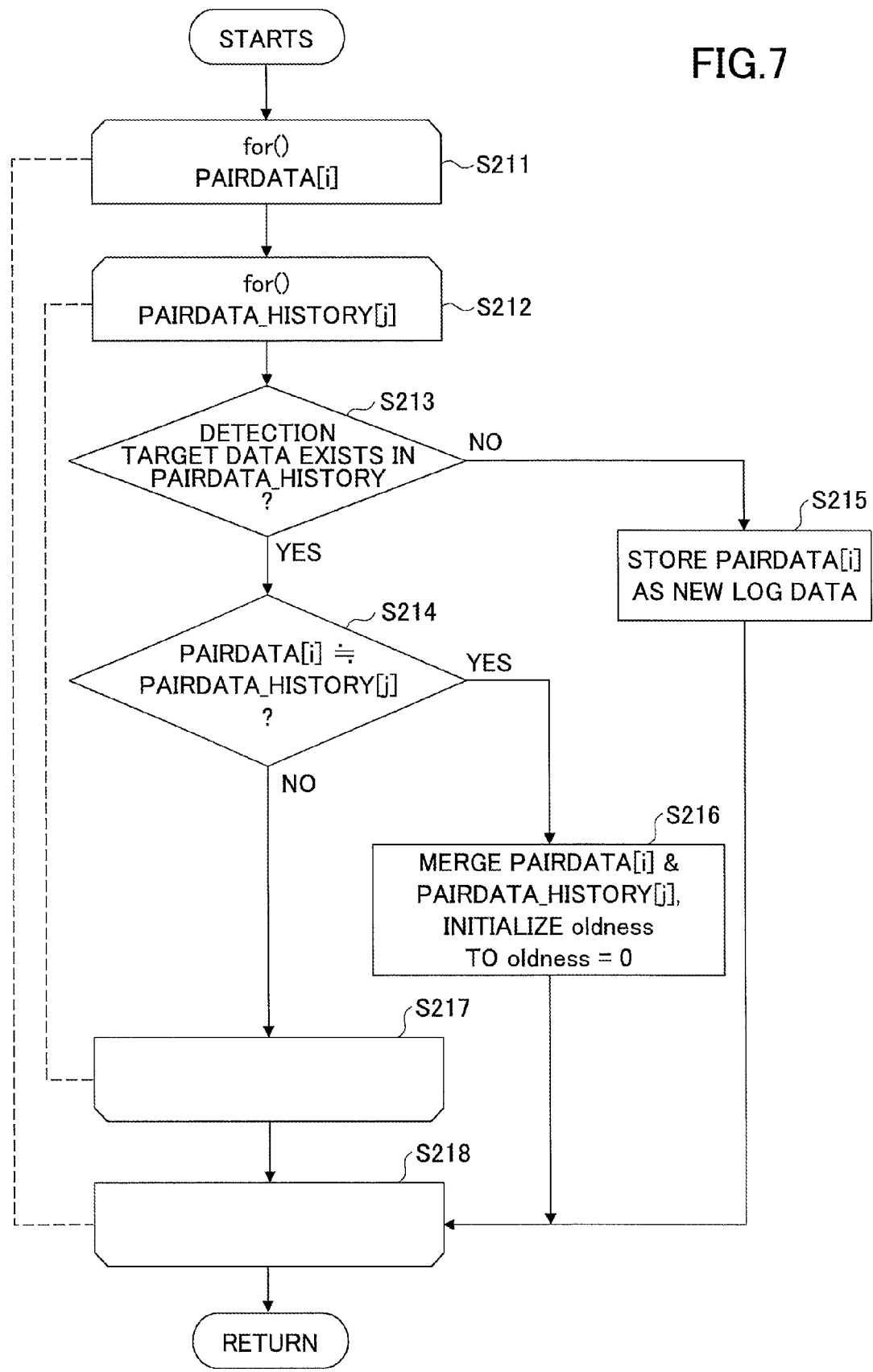
FIG. 7 is a flow chart for explaining an example of a merging process.

FIG. 7 is a flow chart for explaining an example of the merging process of step S21. In FIG. 21, the tracking unit 223, in step S211, acquires detection data PAIRDATA[i] by pairing a difference between the transmission wave in a frequency rising interval and the reflected wave and a difference between the transmission wave in a frequency falling interval and the reflected wave. The tracking unit 223, in step S212, acquires a log(hereinafter referred to as "log data") PAIRDATA_HISTORY[j] of the detection data stored in the storage unit 132. The tracking unit 223 judges, in step S213, whether data related to the same vehicle as the detection data PAIRDATA[i] acquired in step S11 exists within the stored log data PAIRDATA_HISTORY[j], and the process advances to step S214 when the judgment result is YES, and the process advances to step S215 when the judgment result is NO. The tracking unit 223, in step S214, judges whether detection data approximately the same as (that is, having a difference within a predetermined range from) the acquired detection data PAIRDATA[i] exists within the log data PAIRDATA_HISTORY[j], and the process advances to step S216 when the judgment result is YES, and the process advances to step S217 when the judgment result is NO. The tracking unit 223, in step S215, stores the acquired detection data PAIRDATA[i] in the storage unit 132 as new log data PAIRDATA_HISTORY[j], and the process advances to step S218. The tracking unit 223, in step S216, merges the acquired detection data PAIRDATA[i] and the stored log data PAIRDATA_HISTORY[j], initializes a parameter "oldness" to "0", and the process advances to step S218. The parameter "oldness" is used by a process that is performed with respect to the log data PAIRDATA_HISTORY[j], as will be described later. The tracking unit 223, in step S217, repeats the processes of steps S212 through S216 a predetermined number of times with respect to the stored log data PAIRDATA_HISTORY[j], and the process advances to step S218. The tracking unit 223, in step S218, repeats the processes of steps S211 through S217 a predetermined number of times with respect to the acquired detection data PAIRDATA[i], and the process advances to step S22 illustrated in FIG. 6.

Figure 8:
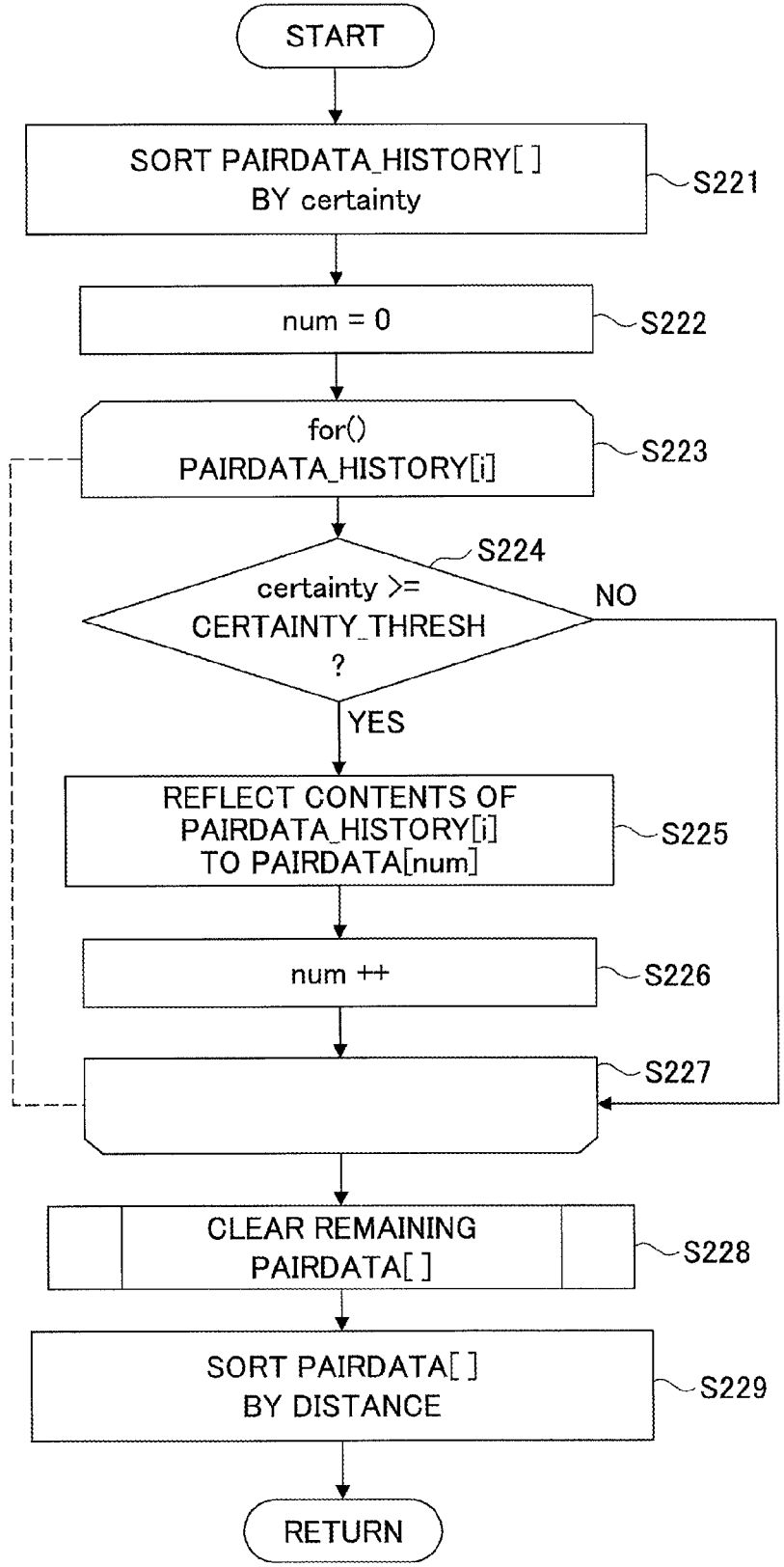
FIG. 8 is a flow chart for explaining an example of a conversion process.

FIG. 8 is a flow chart for explaining an example of the conversion process of step S22. In FIG. 8, the tracking unit 223, in step S221, sorts the stored log data array PAIRDATA_HISTORY[ ] in an order according to a number of times, "certainty", the vehicles are detected, starting from the highest "certainty". The tracking unit 223, in step S222, sets a subscript variable "num" of the detection data array PAIRDATA[ ], that becomes a data transfer destination, to num=0. The tracking unit 223, in step S224, judges whether the number of times, "certainty", the vehicles are detected, is greater than or equal to a threshold value CERTAINTY_THRESHOLD, and the process advances to step S225 when the judgment result is YES, and the process advances to step S227 when the judgment result is NO. The tracking unit 223, in step S225, reflects contents of the log data PAIRDATA_HISTORY[i] to the detection data PAIRDATA[num].

Figure 9:
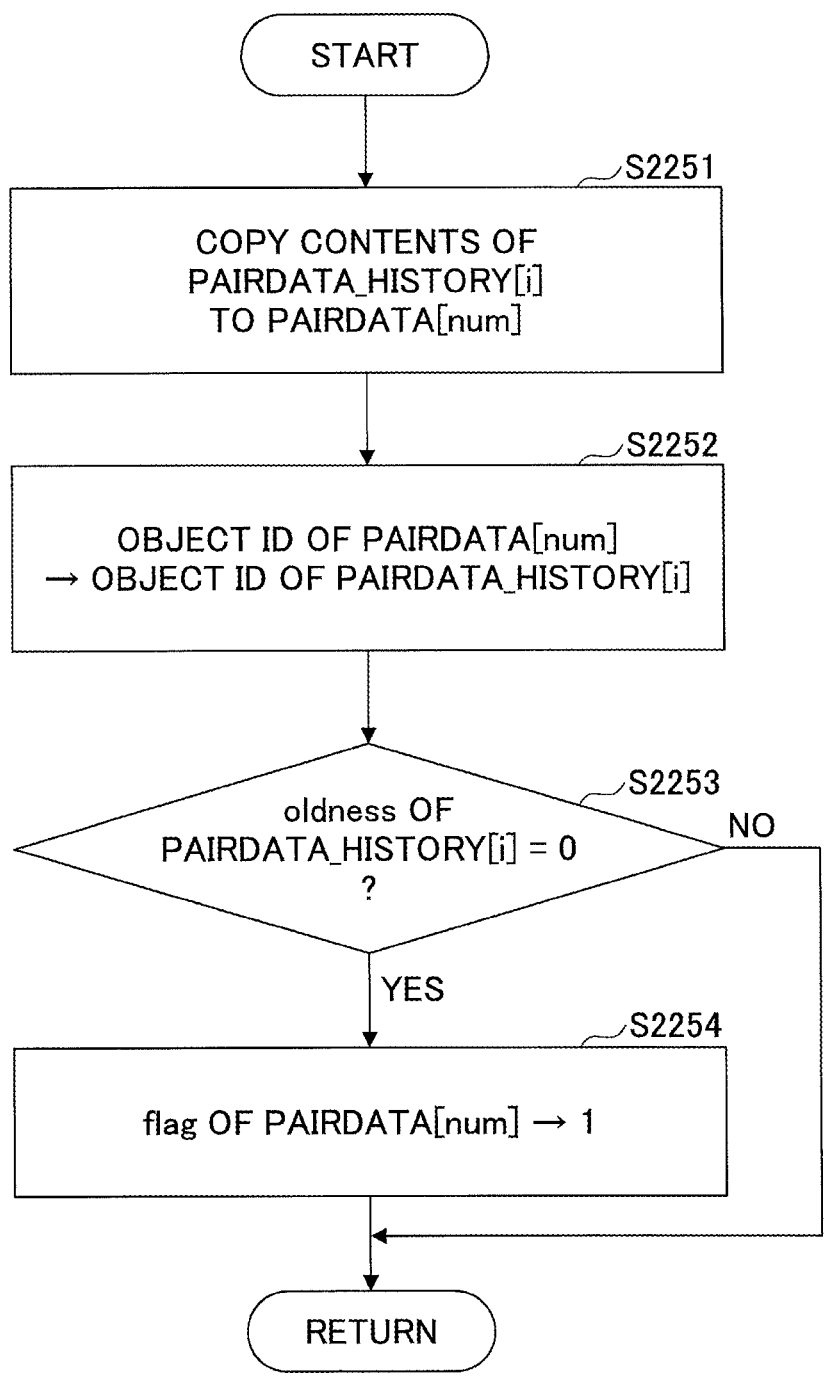
FIG. 9 is a flow chart for explaining an example of a part of the conversion process.

FIG. 9 is a flow chart for explaining an example of a part of the conversion process, that is, the process of step S225. In FIG. 9, the tracking unit 223, in step S2251, copies contents of the log data PAIRDATA_HISTORY[i] to the detection data PAIRDATA[num]. The tracking unit 223, in step S2252, copies an object ID of the log data PAIRDATA_HISTORY[i] to an object ID of the detection data PAIRDATA[num]. The object ID that is a member (or element) of the PAIRDATA_HISTORY structure is an identifier (ID) of the object (that is, vehicle) that is being tracked. This object ID is written when starting the program so that the object ID is unique in the log data array PAIRDATA_HISTORY[ ], and although the order may change due to the sorting process, the object ID will not be rewritten to another object ID. In addition, the object ID exists as a member of the PAIRDATA structure. The object ID is numbered to have a unique value in the detection data PAIRDATA[num] as described above, but the PAIRDATA structure also exists as a member of the log data PAIRDATA_HISTORY[i] in which log ID is undetermined. The tracking unit 223, in step S2253, judges whether a parameter "oldness" indicating an oldness of the log data PAIRDATA_HISTORY[i], that is, the number of estimations, is "0", and the process advances to step S226 illustrated in FIG. 8 when the judgment result is NO. On the other hand, when the judgment result in step S2253 is YES, the tracking unit 223, in step S2254, sets an estimation flag "flag" of the detection data PAIRDATA[num] to "1", and the process advances to step S226 illustrated in FIG. 8. The estimation flag "flag" enables data interpolated by an interpolation process using the data estimated by the tracking process, and data that are actually detected, to be distinguished from each other. The estimation flag "flag" having a value "1" indicates the interpolated data, and the estimation flag "flag" having a value "0" indicates the data that are actually detected. For example, when a medium-sized vehicle is traveling behind a large-sized vehicle such as a truck, an interval may be generated in which the medium-sized vehicle is blocked by the truck and is not detectable by the radar apparatus 1. The interpolation process interpolates missing data of the vehicle in such an interval by estimated data. Hence, when no reflected wave from the vehicle traveling on the road is received with respect to the transmission wave transmitted from the radar apparatus 1, an estimated position where the vehicle is likely to be detected after a predetermined time is estimated based on the detected position of the vehicle already detected from the reflected wave from the vehicle with respect to the transmission wave. The estimated position and the detected position are stored in the storage unit 132, in a manner distinguishable according to the value of the estimation flag "flag".

Returning now to the description of FIG. 8, the tracking unit 223, in step S226, increments a parameter n to n=n+1 (or n++). The tracking unit 223, in step S227, repeats the processes of steps S223 through S226 a predetermined number of times with respect to the log data PAIRDATA_HISTORY [i]. The tracking unit 223, in step S228, clears the remaining members of the detection data array PAIRDATA[ ] that are not filled with the data by the processes of steps S223 through S227. For example, "NULL" indicating no data may be stored in each member of the detection data array PAIRDATA[ ] in which the data have not been converted from the log data array PAIRDATA_HISTORY[ ]. The tracking unit 223, in step S229, sorts the detection data PAIRDATA[i] in an order according to the distance between the radar apparatus 1 and the vehicle, starting from the data belonging to the vehicle closest to the radar apparatus 1, and the process advances to step S23 illustrated in FIG. 6.

Figure 10:
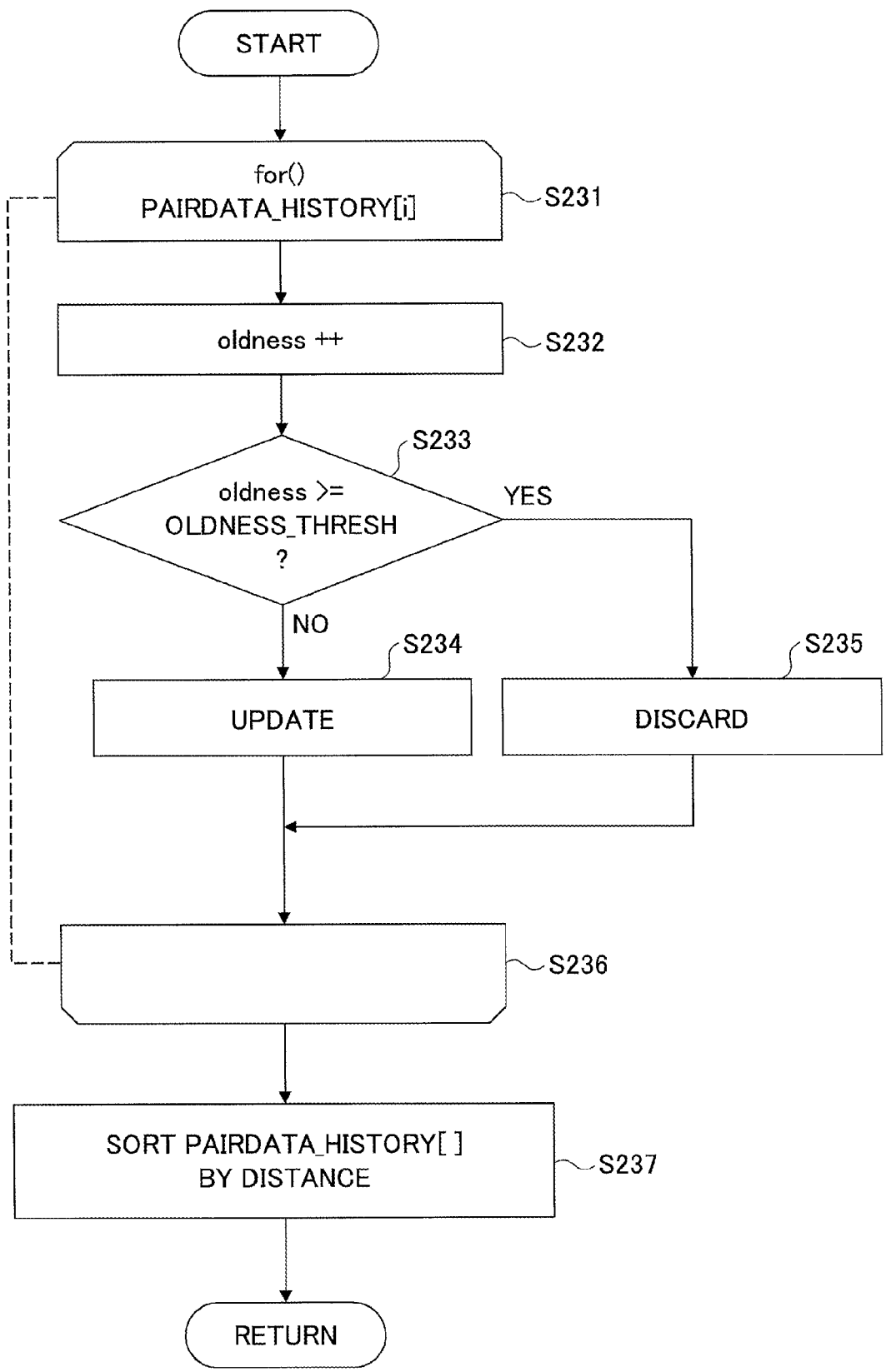
FIG. 10 is a flow chart for explaining an example of an update process.

FIG. 10 is a flow chart for explaining an example of the update process of step S23. In FIG. 10, the tracking unit 223, in step S231, acquires the log data PAIRDATA_HISTORY[i]. The tracking unit 223, in step S232, increments the parameter "oldness" of the log data PAIRDATA_HISTORY[i] to oldness=oldness+1. The tracking unit 223, in step S233, judges whether the parameter "oldness" is less than or equal to a threshold value OLDNESS_THRESH, and the process advances to step S234 when the judgment result is NO, and the process advances to step S235 when the judgment result is YES. The tracking unit 223, in step S234, judges that the log data PAIRDATA_HISTORY[i] is within a valid term (or expiry date or time), uses the log data PAIRDATA_HISTORY [i] to update the estimated position for a next measurement timing, and the process advances to step S236. The tracking unit 223, in step S235, discards the log data PAIRDATA_HISTORY[i] as data older than a predetermined time (that is, exceeding the valid term), and the process advances to step S236. The tracking unit 223, in step S236, repeats the processes of steps S231 through S235 a predetermined number of times with respect to the stored log data PAIRDATA_HISTORY[i], and the process advances to step S237. The tracking unit 223, in step S237, sorts the log data array PAIRDATA_HISTORY[ ] in an order according to the distance between the radar apparatus 1 and the vehicle, starting from the data belonging to the vehicle closest to the radar apparatus 1, and the process returns to the FIG. 6 and the tracking process ends.

Figure 11:
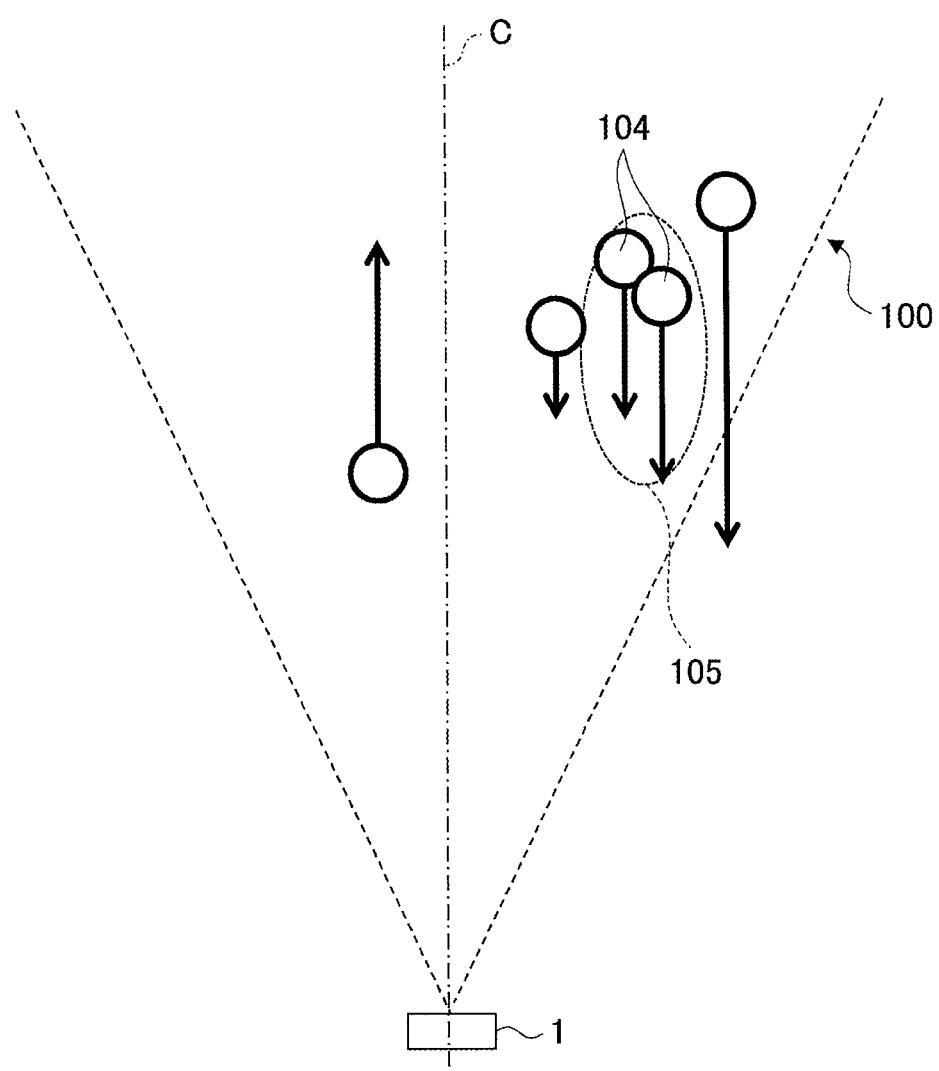
FIG. 11 is a diagram for explaining an example of a grouping process.

FIG. 11 is a diagram for explaining an example of the grouping process of step S3. In FIG. 11, those parts that are the same as those corresponding parts in FIG. 4 are designated by the same reference numerals, and a description thereof will be omitted. In this example, the grouping process judges by a known method that a plurality of vehicles 104 whose detection data are within the scanning angular range 100 and having a difference in the positions, velocities, or the like less than a predetermined value are a single vehicle, and groups the plurality of vehicles 104 into a single group 105. The grouping process further merges the detection data of the plurality of vehicles 104 belonging to the single group 105.

In the extracting process of step S4, the extracting unit 225 sorts the detection data of the vehicles according to the predetermined condition with respect to the parameters, and assigns the priority order to the sorted detection data. The extracting process extracts and outputs the detection data according to the priority order, starting from the detection data having the high priority order according to the number of data to be output, for example.

Figure 12:
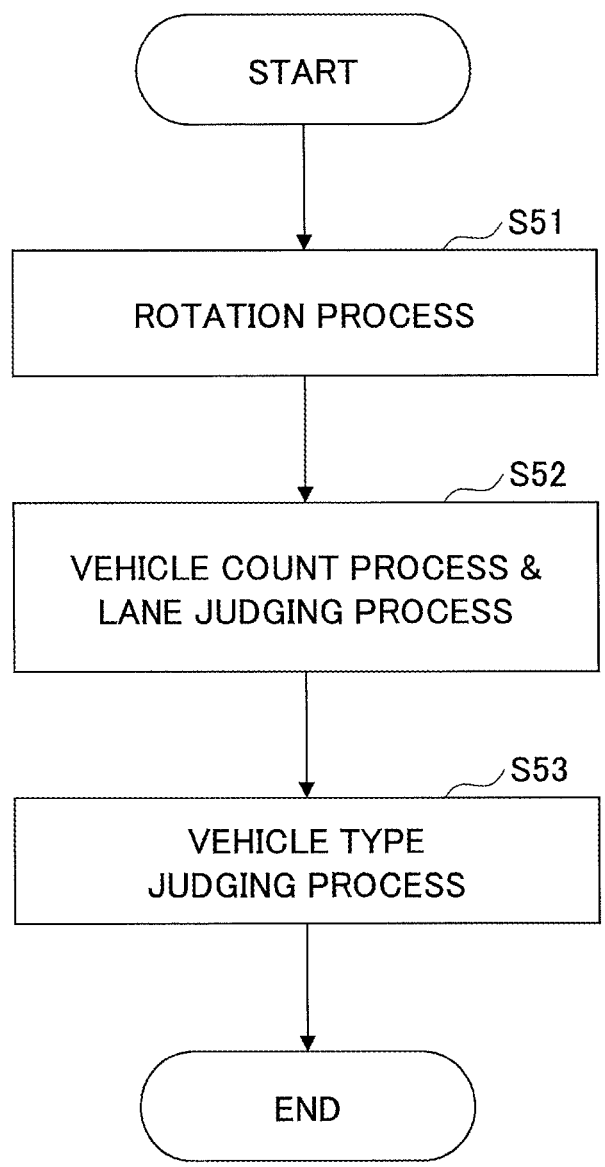
FIG. 12 is a flow chart for explaining an example of a judging process.
Figure 13:
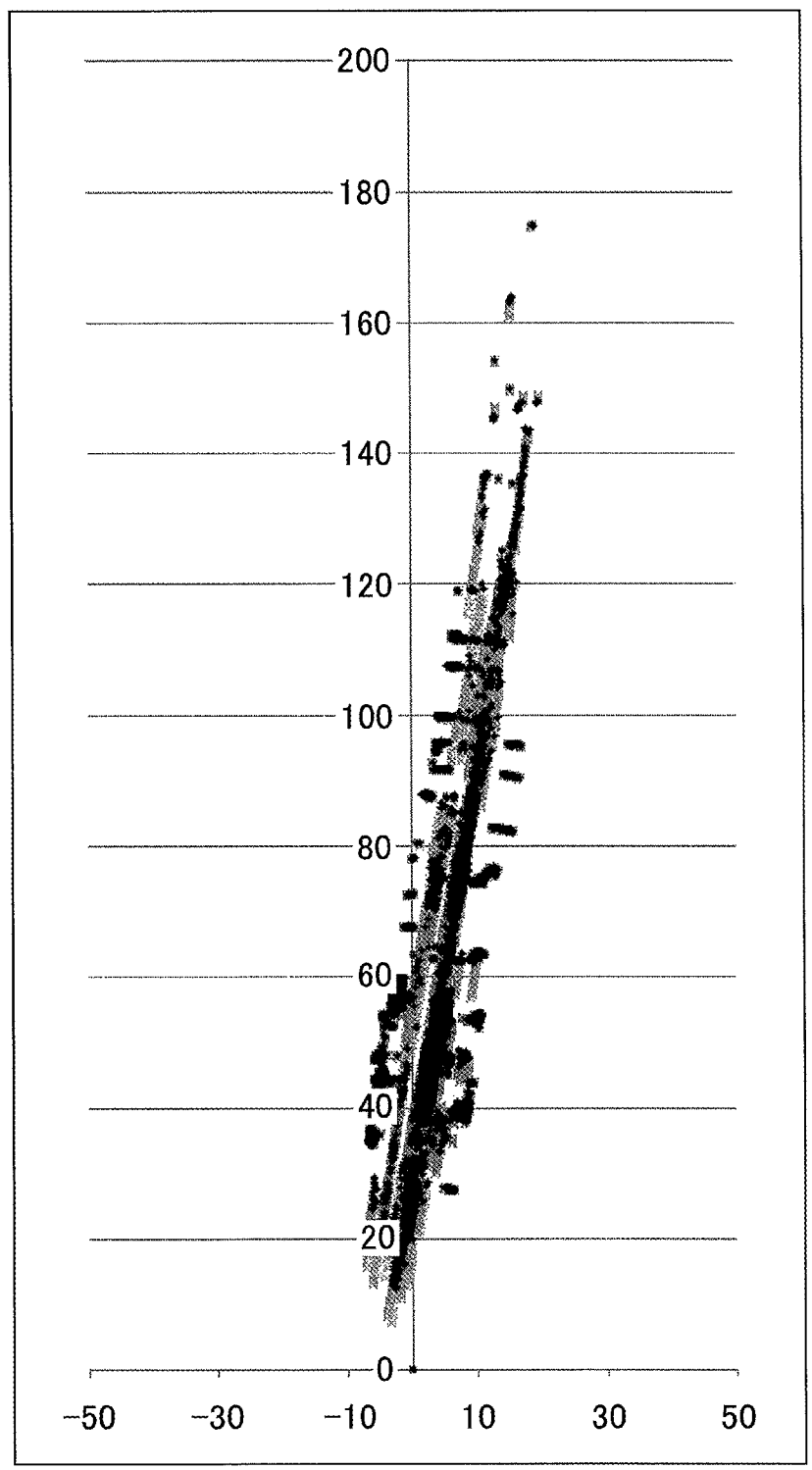
FIG. 13 is a diagram illustrating an example of detection results.
Figure 14:
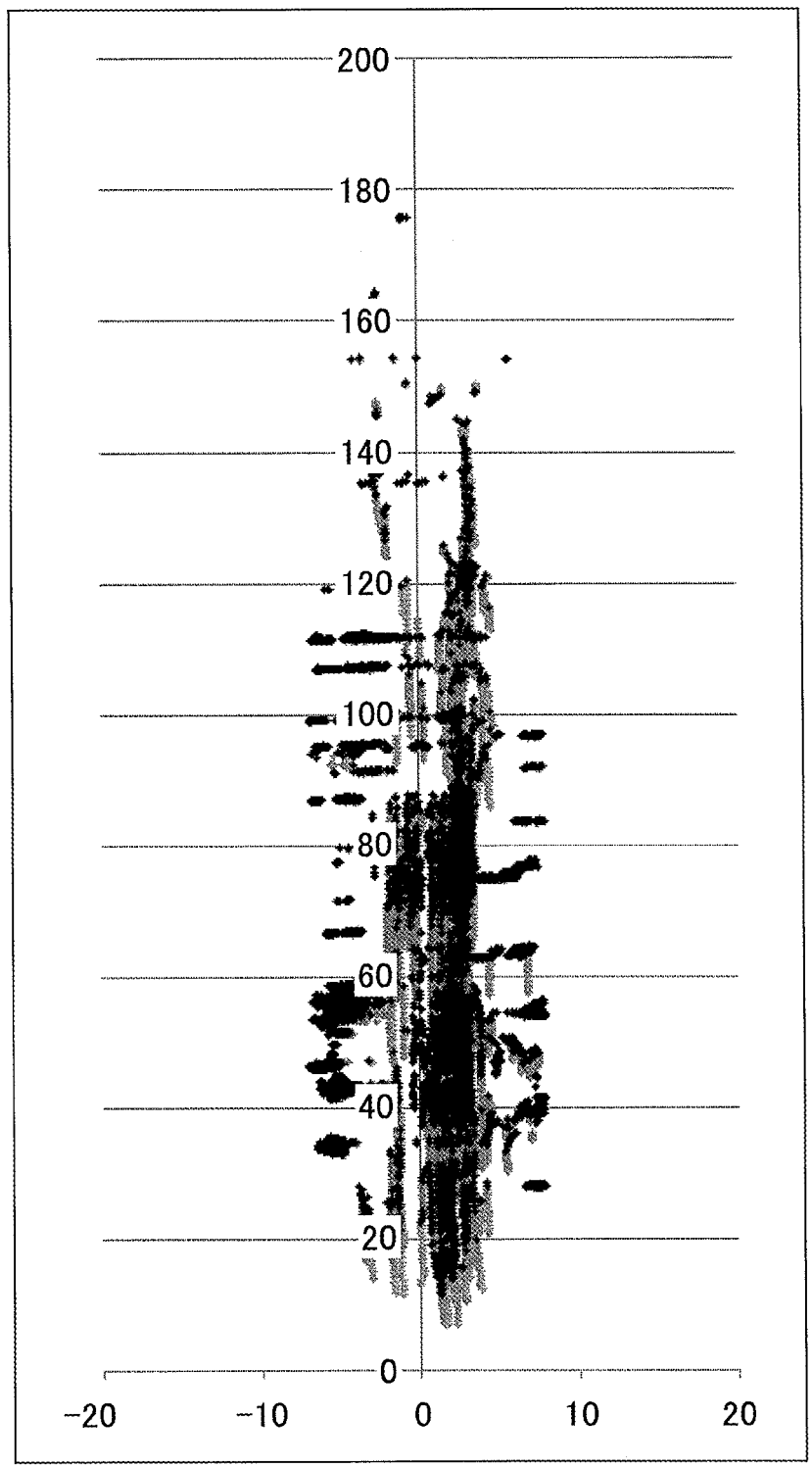
FIG. 14 is a diagram illustrating an example of results obtained by subjecting the detection results illustrated in FIG. 13 to a rotation process.

FIG. 12 is a flow chart for explaining an example of the judging process of step S5. In FIG. 12, the judging unit 23, in step S51, performs a rotation process with respect to the detection results output from the detecting means or unit described above. FIG. 13 is a diagram illustrating an example of the detection results. In FIG. 13, the ordinate indicates a length (m) of the transmission wave (beam) from the radar apparatus 1 (that is, the antenna part 11), and the abscissa indicates a horizontal distance (m) along a direction perpendicular to the lanes. As illustrated in FIG. 13, for example, the detection results are in coordinates of a coordinate system different from that on the road and are rotated, due to the relationship between the scanning range of the radar apparatus 1 and the lanes on the road. Hence, the rotation process rotates the detection results illustrated in FIG. 13 that are represented by relative coordinate values of a polar coordinate system of the radar apparatus 1, in order to convert the detection results into detection results represented by coordinate values of the coordinate system on the road, as illustrated in FIG. 14. FIG. 14 is a diagram illustrating an example of the results obtained by subjecting the detection results illustrated in FIG. 13 to the rotation process. In FIG. 14, the ordinate indicates a horizontal distance (m) along a direction parallel to the lanes from the radar apparatus 1, and the abscissa indicates the horizontal distance (m) along the direction perpendicular to the lanes. In FIGS. 13 and 14, data indicated in black represent the actual detection results, and data indicated in gray represent the data estimated by the tracking process described above and interpolated by the interpolation process described above.

Figure 15:
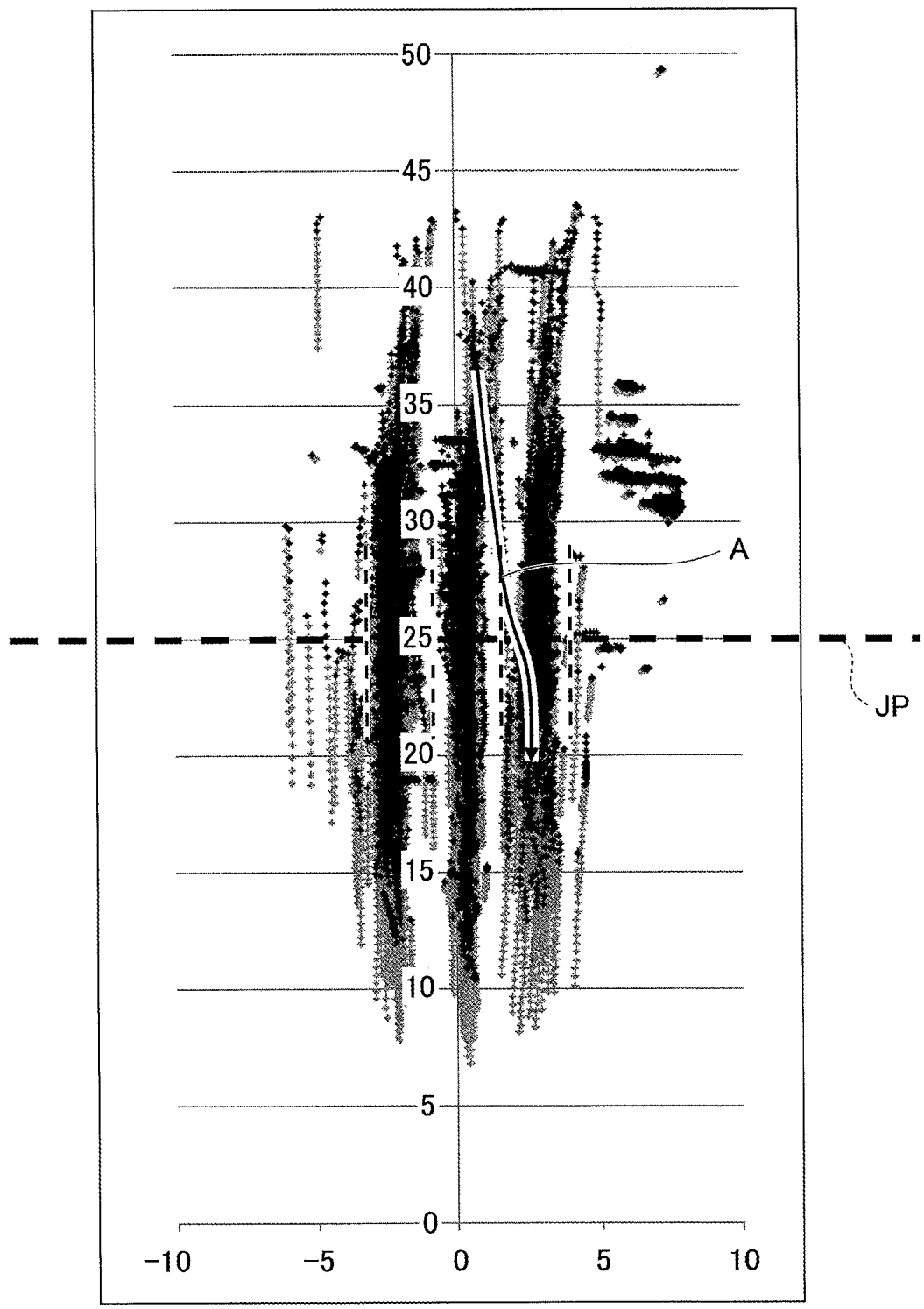
FIG. 15 is a diagram for explaining an example of a vehicle count process and a lane judging process.

After step S51, the judging unit 23, in step S52, performs a vehicle count process and a lane judging process. FIG. 15 is a diagram for explaining an example of the vehicle count process and the lane judging process of step S52. In FIG. 15, the ordinate and the abscissa are the same as those of FIG. 14. In addition, in FIG. 15, data indicated in black represent the actual detection results, and data indicated in gray represent the data interpolated by the interpolation process described above. Further, in FIG. 15, a bold horizontal dotted line indicates a count and lane judging position JP perpendicular to the lanes. The count and lane judging position JP is the position where the count is made, and is also the position where the lane judgment is made. The count and lane judging position JP is located at a horizontal distance JPm from the radar apparatus 1 along the direction parallel to the lanes, and in this example, the horizontal distance JPm is 25 m. In FIG. 15, bold vertical dotted lines indicate boundaries of the lanes, and in this example, it is assumed for the sake of convenience that there are three (3) lanes.

Figure 16:
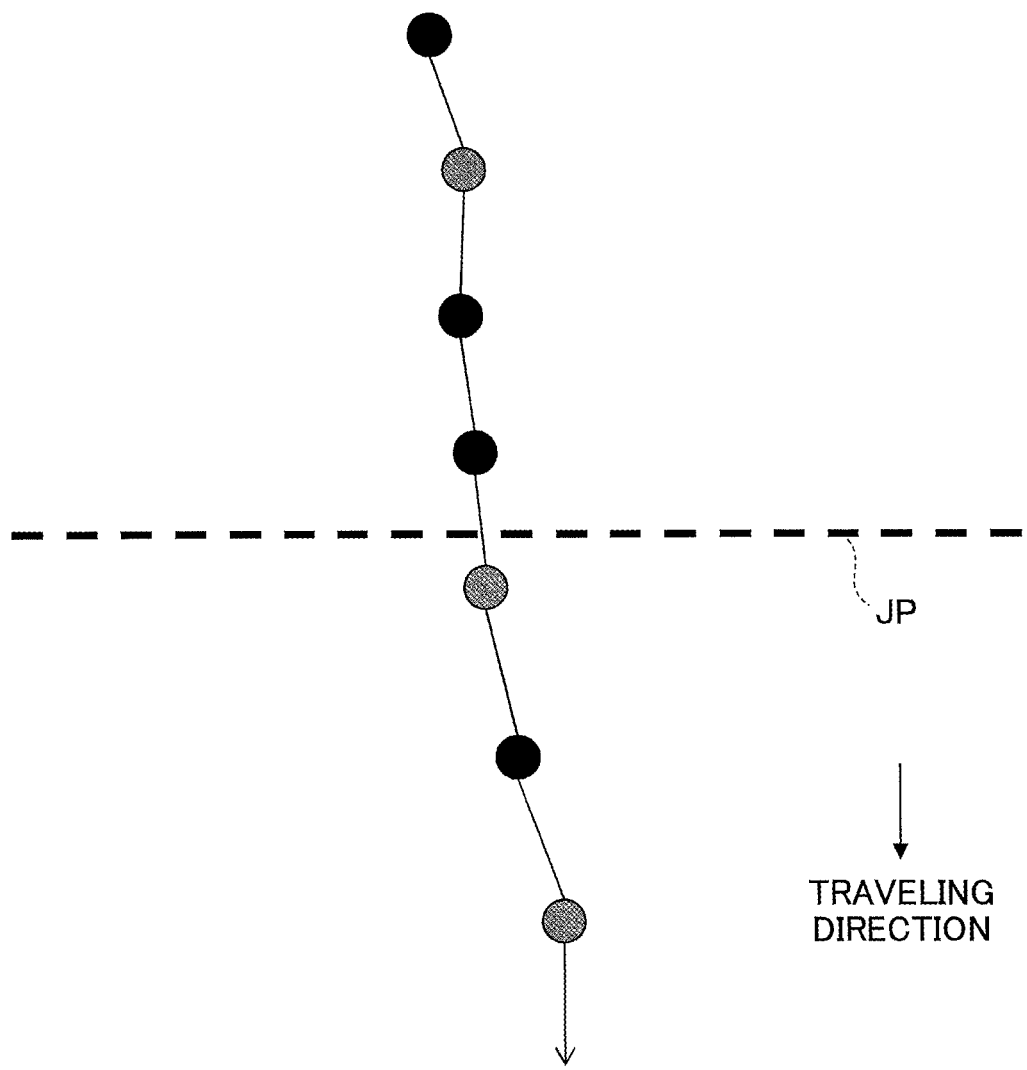
FIG. 16 is a diagram for explaining an example of the vehicle count.

The count process counts the vehicles passing the count and lane judging position JP, and can obtain the number of vehicles passing the count and lane judging position JP. For example, a previous sample position of the vehicle and a present (or current) sample position of this vehicle are compared, and this vehicle is counted when the present sample position of this vehicle extends beyond the count and lane judging position JP along the traveling direction of this vehicle as illustrated in FIG. 16. FIG. 16 is a diagram for explaining an example of the vehicle count, and circular marks indicate sample positions of the vehicle. In FIG. 16, a black circular mark indicates the actual sample position, and a grey circular mark indicates the sample position interpolated by the interpolation process. Further, in this example, it is assumed for the sake of convenience that the traveling direction of the vehicle is the direction towards the radar apparatus 1.

The lane judging process tracks a traveling locus of each vehicle, and judges the lane on which each vehicle is located at a point in time when each vehicle passes the count and lane judging position JP, in order to judge the lane in which each vehicle is traveling. The boundaries of each lane is determined depending on the road to be monitored by the radar apparatus 1, and thus, coordinate values of the boundaries of each lane on the road are known in advance. In the example illustrated in FIG. 15, the traveling locus of the vehicle indicated by a bold arrow A is located on the rightmost lane at the point in time when this vehicle passes the count and lane judging position JP, and thus, it is judged that this vehicle is traveling in the rightmost lane. When detecting the vehicles traveling in the direction towards the radar apparatus 1, the rightmost lane in FIG. 15 is the leftmost lane when viewed from the drivers of the traveling vehicles.

Figure 17:
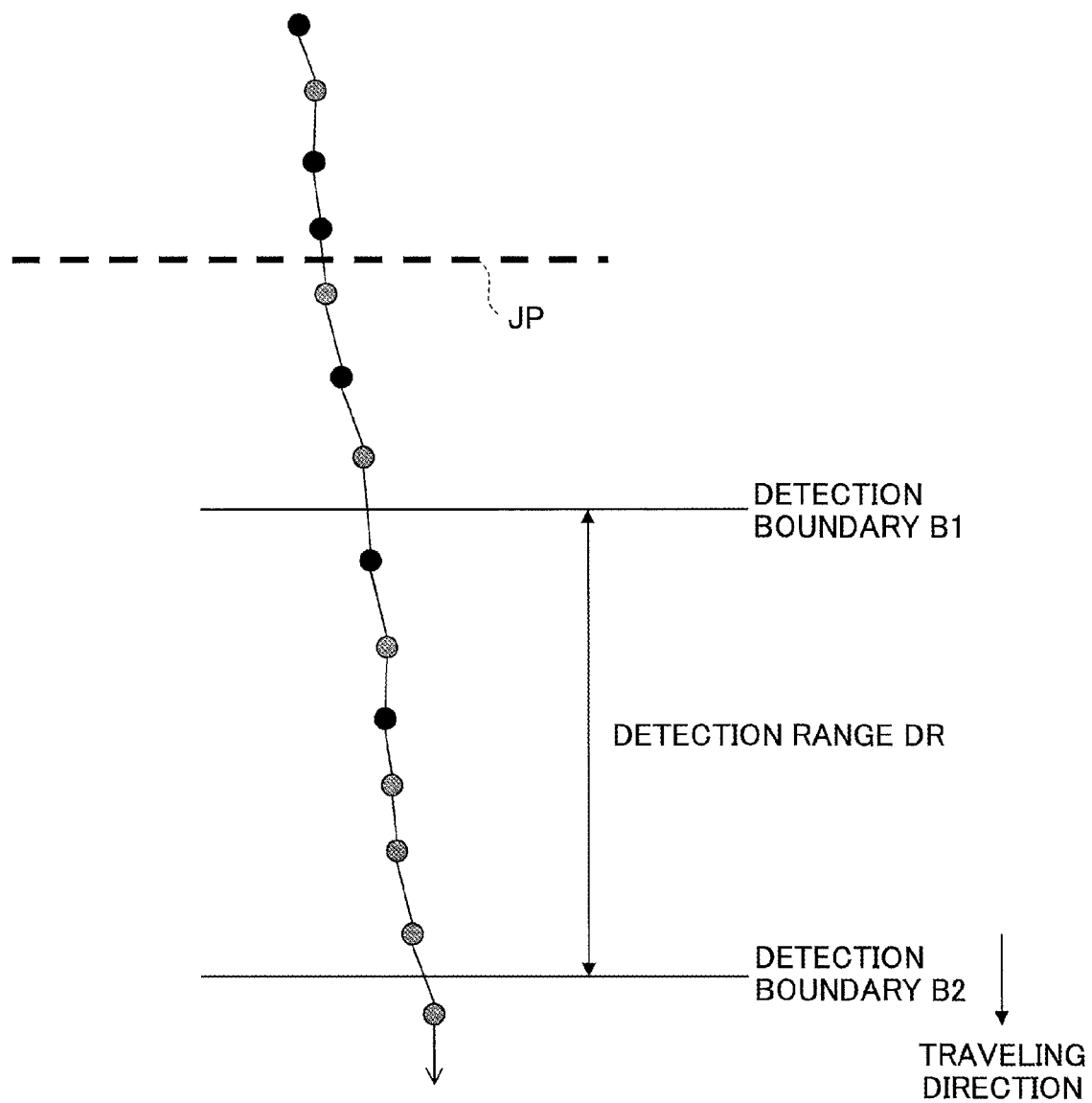
FIG. 17 is a diagram for explaining an example of a vehicle type judging process.

After step S52, the judging unit 23, in step S53, performs a vehicle type judging process. FIG. 17 is a diagram for explaining an example of the vehicle type judging process. In FIG. 17, those parts that are the same as those corresponding parts in FIG. 16 are designated by the same reference numerals, and a description thereof will be omitted. In FIG. 17, a detection range DR defined by a first detection boundary B1 and a second detection boundary B2 perpendicular to the lanes are used to judge the vehicle type, that is, the size of the vehicle. The vehicle type may be judged by counting the number of times the same vehicle, that is a detection target, is detected within the detection range DR, and judging the vehicle type based on a comparison between the count value and a reference count value. This example counts the vehicle at the actual sample positions indicated by the black circular marks within the detection range DR. For example, the size of the vehicle may be judged to be greater than or equal to a predetermined size when the count value is greater than the reference count value. In addition, the size of the vehicle may be judged to be less than the predetermined size when the count value is less than or equal to the reference count value.

The count value may be used to obtain a vehicle detection rate to be described later, in order to judge that the size of the vehicle is greater than or equal to the predetermined size when the vehicle detection rate exceeds a threshold value. In this case, a vehicle detection rate Dr may be computed from Dr=(K/P)×100, where K denotes a count value of the number of times the vehicle is detected at the actual sample position within the detection range DR, and P denotes a parameter represented by the following formula.

$$P=\{|B1m-B2m|/V\} \times W$$

In the above formula, B1m denotes a horizontal distance (m) from the radar apparatus 1 to the detection boundary B1, B2m denotes a horizontal distance (m) from the radar apparatus 1 to the detection boundary B2, W denotes a number of times the measurement is made per one (1) second (time/s), and V denotes a velocity (m/s) of the vehicle within the detection range DR. The velocity V of the vehicle may be one of the velocities of the vehicle detected within the detection range DR, or an average of the velocities of the vehicle detected within the detection range DR. The horizontal distance from the radar apparatus 1 satisfies relationships JP>B2m and B1m>B2m, and the size relationship between JP and B1m is not limited to a particular relationship.

Accordingly, the judging unit 23 may function as an example of the judging means or unit to judge the lane in which the vehicle travels, and may also function as an example of the count means or unit to count the number of vehicles traveling in each lane. Hence, the number of traveling vehicles and the type of the traveling vehicles, that is, the size of the traveling vehicles, can be measured for each lane on the road.

The judging unit 23 may track the traveling locus of the vehicle and compute the vehicle detection rate Dr from Dr=(K/Pa)×100 and judge that the size of the vehicle is greater than or equal to the predetermined size when the vehicle detection rate Dr exceeds a threshold value, where K denotes the count value of the number of times the vehicle is counted at the actual sample position within the detection range DR, and Pa denotes a number of traveling loci of the vehicles tracked within the detection range DR.

Figure 18:
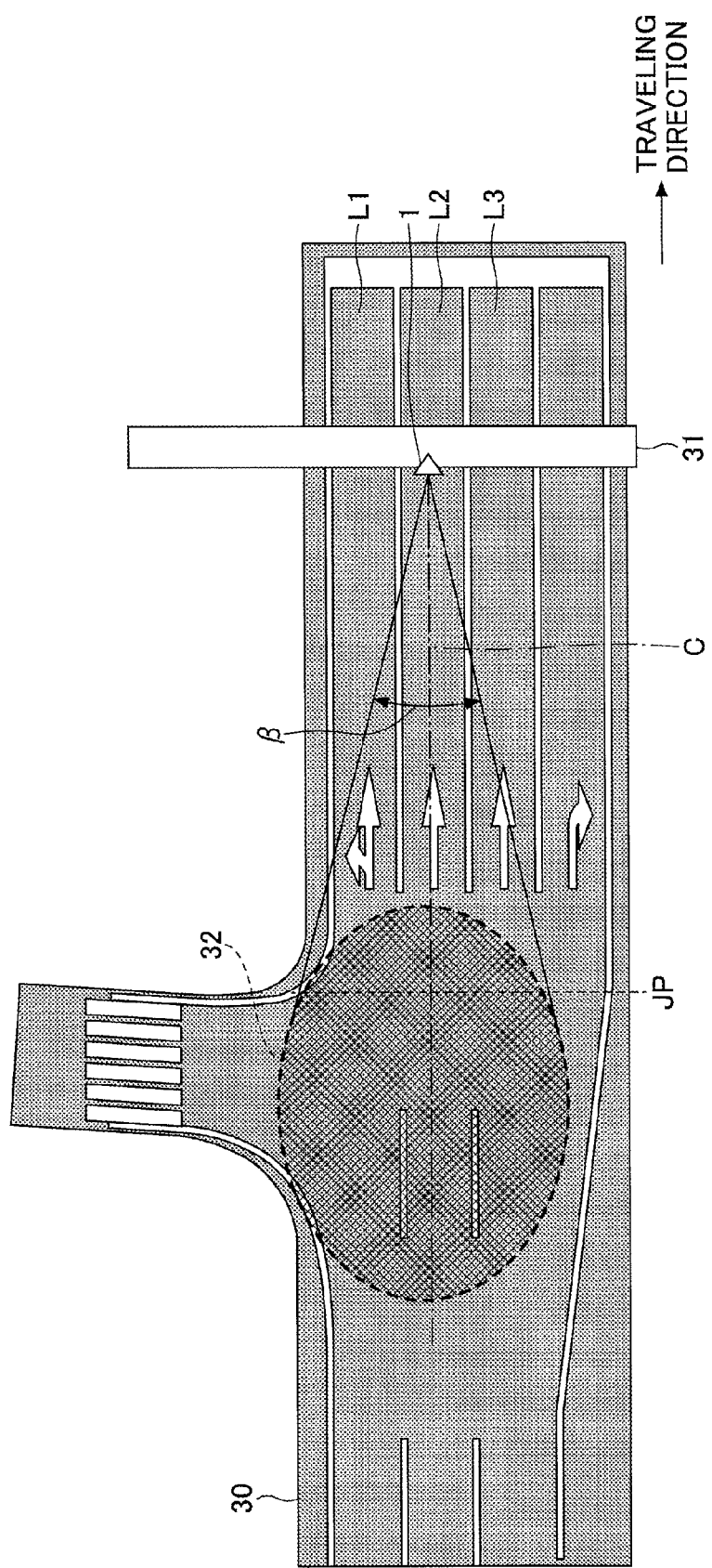
FIG. 18 is a plan view schematically illustrating an example of a road that is a measuring target.
Figure 19:
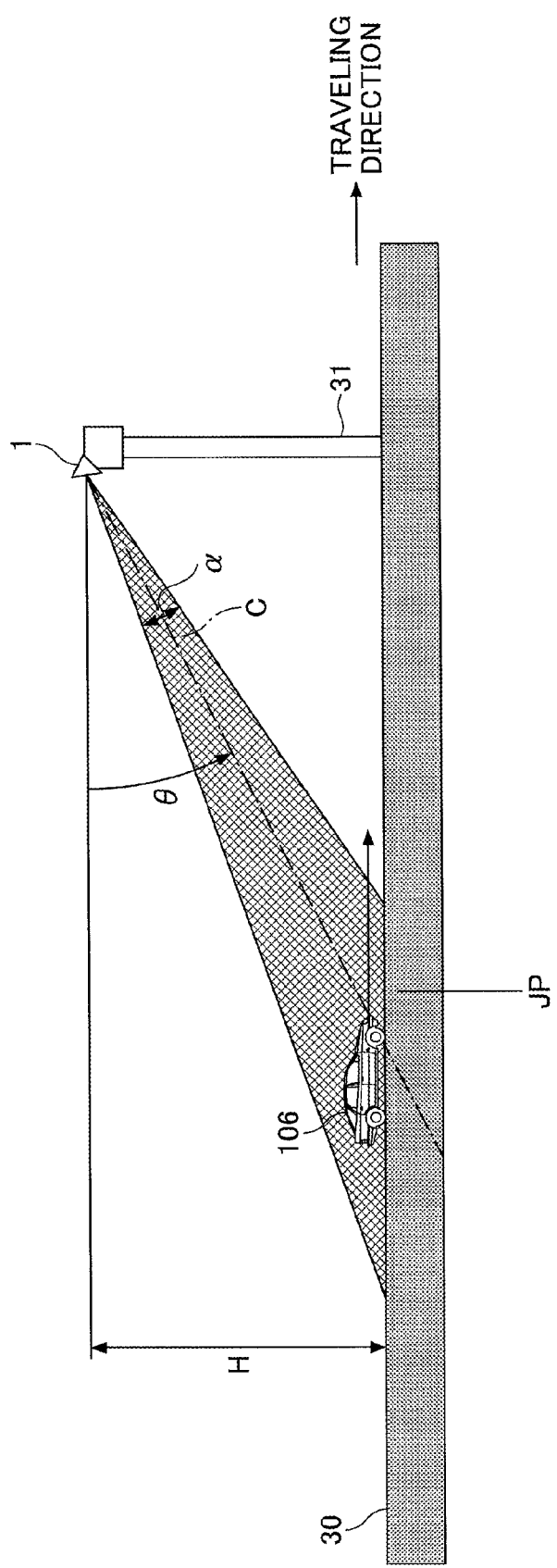
FIG. 19 is a side view schematically illustrating the road illustrated in FIG. 18.

FIG. 18 is a plan view schematically illustrating an example of the road that is a measuring target. FIG. 19 is a side view schematically illustrating the road illustrated in FIG. 18. In FIGS. 18 and 19, the radar apparatus 1 is provided at a position having a height H from a road surface 30, on a support part 31 that extends in a sideways-U-shape or an L-shape from the road surface 30. The height H is set in a range of 5 m to 12 m, for example. An angle β has a spread in the plan view of FIG. 18, and an angle α has a spread in the side view of FIG. 19. The angle α is set in a range of 4° to 6°, for example, and the angle β is set to 30°, for example. The angle α is sometimes also referred to as an FOV (Field Of View). A tilt angle θ of the radar apparatus 1 is the angle formed by a plane parallel to the road surface 30 at the height H of the radar apparatus 1, and the center C of the scanning angular range of the radar apparatus 1. The tilt angle θ may be set in a range of 5° to 20°, for example. Further, the tilt angle θ of the radar apparatus 1 may be set in a range of 11° to 15°. In FIG. 18, a reference numeral 32 indicates the scan range of the radar apparatus 1 on the road surface 30, and the illustration of the vehicles will be omitted. In FIG. 19, a reference numeral 106 indicates an example of the vehicle traveling on the road surface 30. In FIGS. 18 and 19, it is assumed for the sake of convenience that the traveling direction of the vehicles is from the left to the right. In addition, in FIG. 18, L1, L2, and L3 indicate the lanes in which the vehicle 106, which is the detection target of the radar apparatus 1, travels. The transmission wave from the radar apparatus 1 directly hits the road surface in a range in which the horizontal distance from the radar apparatus 1 is 15 m to 40 m, for example.

The present inventors counted the number of vehicles at the count and judging position JP for a case in which H=6.8 m, θ=14.5°, and the horizontal distance of the count and lane judging position JP from the radar apparatus 1 along the direction parallel to the lanes L1 through L3 is JPm=26 m. More particularly, the number of vehicles at the count and judging position JP is counted, by setting the horizontal distance B2m of the detection boundary B2 from the radar apparatus 1 along the direction parallel to the lanes L1 through L3 to B2m=19 m, and variably setting the horizontal distance B1m of the detection boundary B1 from the radar apparatus 1 along the direction parallel to the lanes L1 through L3 to B1m=30 m to 20 m.

FIG. 20 is a diagram illustrating the number of vehicles detected in the lane L1 within the detection range DR, together with the vehicle detection rate Dr (%), for B1m=30 m to 20 m. FIG. 21 is a diagram illustrating a number of vehicles detected in the lane L2 within the detection range DR, together with the vehicle detection rate Dr (%), for B1m=30 m to 20 m. FIG. 22 is a diagram illustrating a number of vehicles detected in the lane L3 within the detection range DR, together with the vehicle detection rate Dr (%), for B1m=30 m to 20 m. In this example, the vehicle having the size greater than or equal to the predetermined size are judged to be the large-sized vehicle.

The actual measured value, that is, the true value, of the count value of the large-sized vehicles counted within the detection range DR for the lane L1 in a certain time band is thirteen (13) for the data indicated by a dot pattern AL1-1, and is eighteen (18) for the data indicated by a dot pattern AL1-2. In this example, it can be confirmed for the lane L1 that a detection accuracy of the large-sized vehicles is sufficiently high when the vehicle detection rate Dr is 60% or higher.

The actual measured value, that is, the true value, of the count value of the large-sized vehicles counted within the detection range DR for the lane L2 in the certain time band is nine (9) for the data indicated by a dot pattern AL2-1, and is thirteen (13) for the data indicated by a dot pattern AL2-2. In this example, it can be confirmed for the lane L2 that the detection accuracy of the large-sized vehicles is sufficiently high when the vehicle detection rate Dr is 75% or higher.

The actual measured value, that is, the true value, of the count value of the large-sized vehicles counted within the detection range DR for the lane L3 in the certain time band is sixteen (16) for the data indicated by a dot pattern AL3-1, and is twenty-five (25) for the data indicated by a dot pattern AL3-2. In this example, it can be confirmed for the lane L3 that the detection accuracy of the large-sized vehicles is sufficiently high when the vehicle detection rate Dr is 50% or higher.

It can be confirmed that results similar to those illustrated in FIGS. 20 through 22 can also be obtained in cases such when B2m=17.5 m, B2m=18 m, or the like. In addition, it can also be confirmed that results similar to those illustrated in FIGS. 20 through 22 are also obtained when the height H is in the range of 5 m to 12 m, the angle α is in the range of 4° to 6°, and the tilt angle θ is in the range of 11° to 15°.

Figure 23:
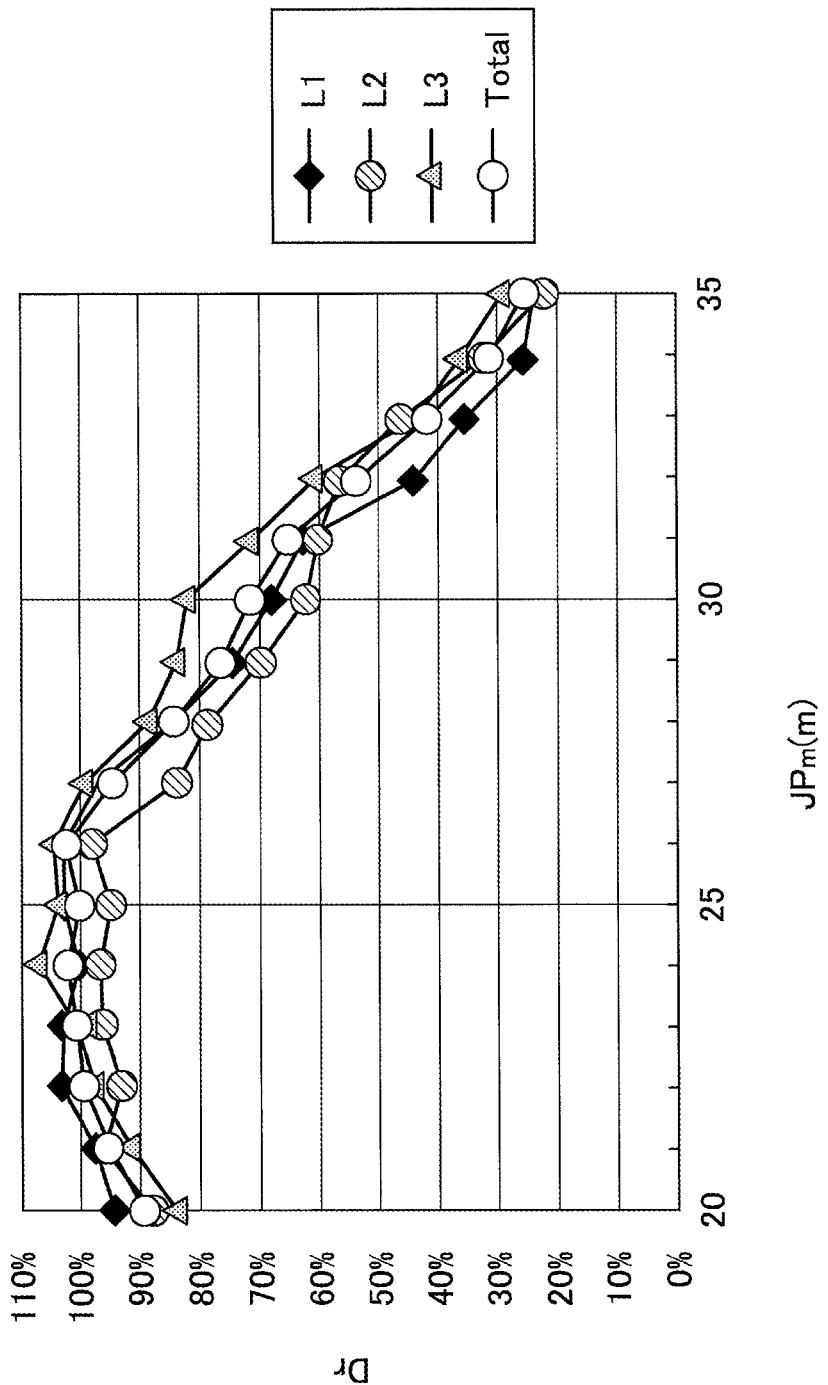
FIG. 23 is a diagram illustrating an example of a relationship between the vehicle detection rate Dr and a count and lane judging position JP.

FIG. 23 is a diagram illustrating an example of a relationship between the vehicle detection rate Dr and the count and lane judging position JP under conditions similar to those of FIGS. 20 through 22. In FIG. 23, the ordinate indicates the vehicle detection rate Dr (5), and the abscissa indicates the horizontal distance JPm (m) of the count and lane judging position JP from the radar apparatus 1 along the direction parallel to the lanes. In FIG. 23, "Total" indicates the vehicle detection rate Dr for all of the lanes L1, L2, and L3 that are monitoring targets. It can be confirmed that the vehicle detection rate Dr becomes 90% or higher when the horizontal distance JPm of the count and lane judging position JP in FIG. 23 is within a range of 22 m to 26 m, for example. A part where the vehicle detection rate Dr exceeds 100% in FIG. 23 corresponds to a case in which the same large-sized vehicle is detected two or more times due to detecting a front windshield glass and a rear wall of a cargo space of the same large-sized vehicle, or the like.

When the actual measured value, that is, the true value of the number of vehicles is measured under the above described conditions, it can be confirmed that the vehicle detection rate Dr has a judging accuracy of ±3% with respect to the actual measured value, that is, the true value of the number of vehicles measured, and that the count value of the number of large-sized vehicles has a judging accuracy of ±20% with respect to the actual measured value, that is, the true value of the number of large-sized vehicles measured.

The count and lane judging position JP and the detection boundaries B1 and B2 may be set for each of the lanes L1, L2, and L3.

The threshold value of the vehicle detection rate Dr at which the detection accuracy of the large-sized vehicles becomes sufficiently high in the certain time band described above is 60% for the lane L1, 75% for the lane L2, and 50% for the lane L3. In other words, the threshold value of the vehicle detection rate Dr at which the detection accuracy of the large-sized vehicles becomes sufficiently high in the certain time band is different for each of the lanes L1, L2, and L3. The threshold value of the vehicle detection rate Dr at which the detection accuracy of the large-sized vehicles becomes sufficiently high in the certain time band is different for each of the lanes L1, L2, and L3, because a scanning range 32 of the radar apparatus 1 has an oval shape as illustrated in FIG. 18, and an interval in which the vehicle is detectable differs depending on the position within the scanning range 32.

Figure 24:
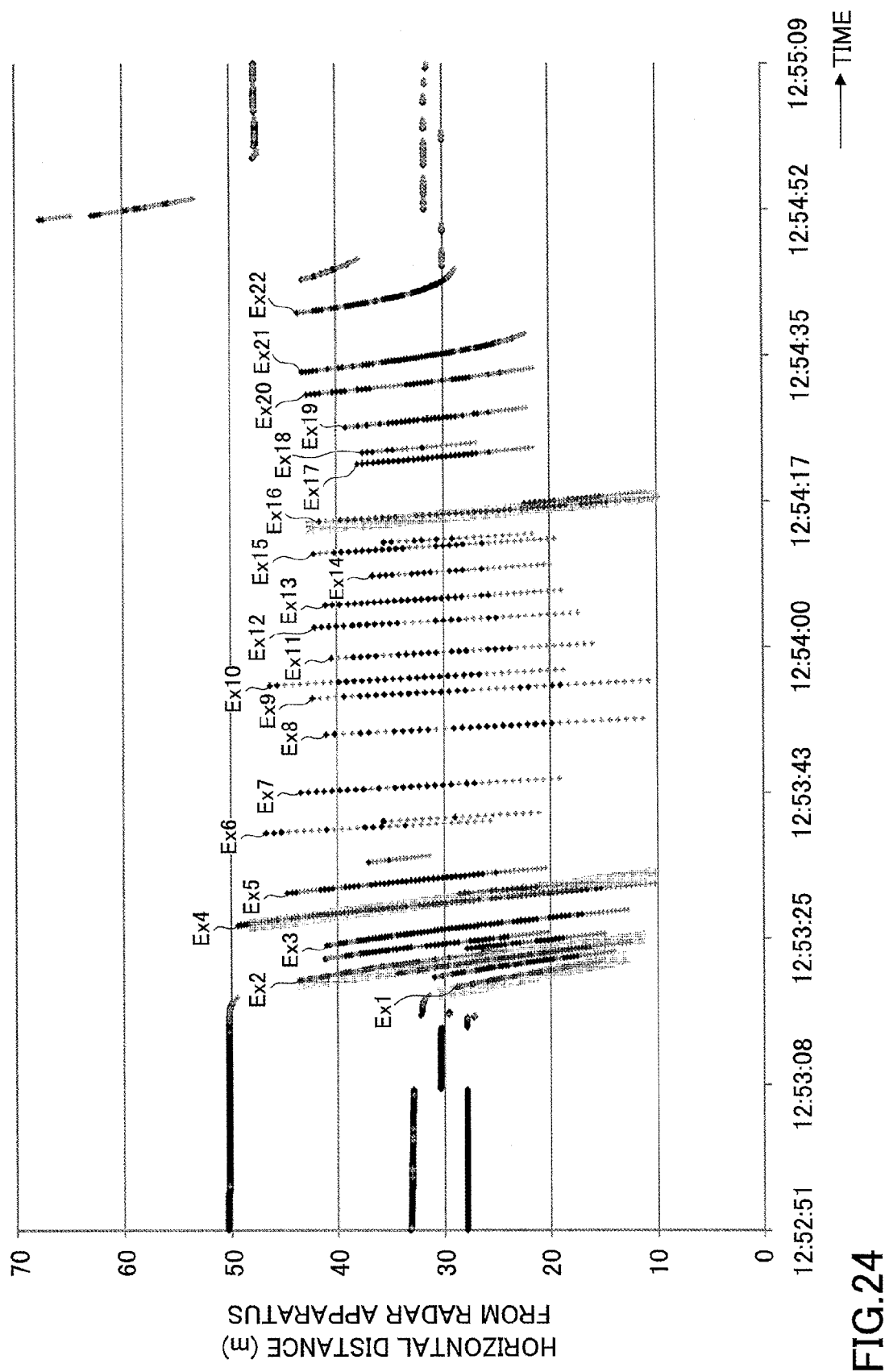
FIG. 24 is a diagram for explaining a traveling locus of a vehicle detected at a certain time band by the radar apparatus illustrated in FIG. 18.

FIG. 24 is a diagram for explaining a traveling locus of a vehicle traveling in the lane L1 and detected at the certain time band by the radar apparatus 1 illustrated in FIG. 18. In FIG. 24, the ordinate indicates the horizontal distance (m) from the radar apparatus 1, and the abscissa indicates the time. For example, the parameters are set so that JPm=26 m, B1m=25 m, B2m=19 m, H=6.8 m, α=4°, and θ=11.8° to 12.2°. In addition, in FIG. 24, data indicated in black represent the actual detection results, data indicated in grey represent the data interpolated by the interpolation process, and data indicated by a dot pattern represent the data of the vehicle that is judged to be the large-sized vehicle. Further, Ex1 through Ex22 indicate examples of the data of the monitored vehicles.

Figure 25:
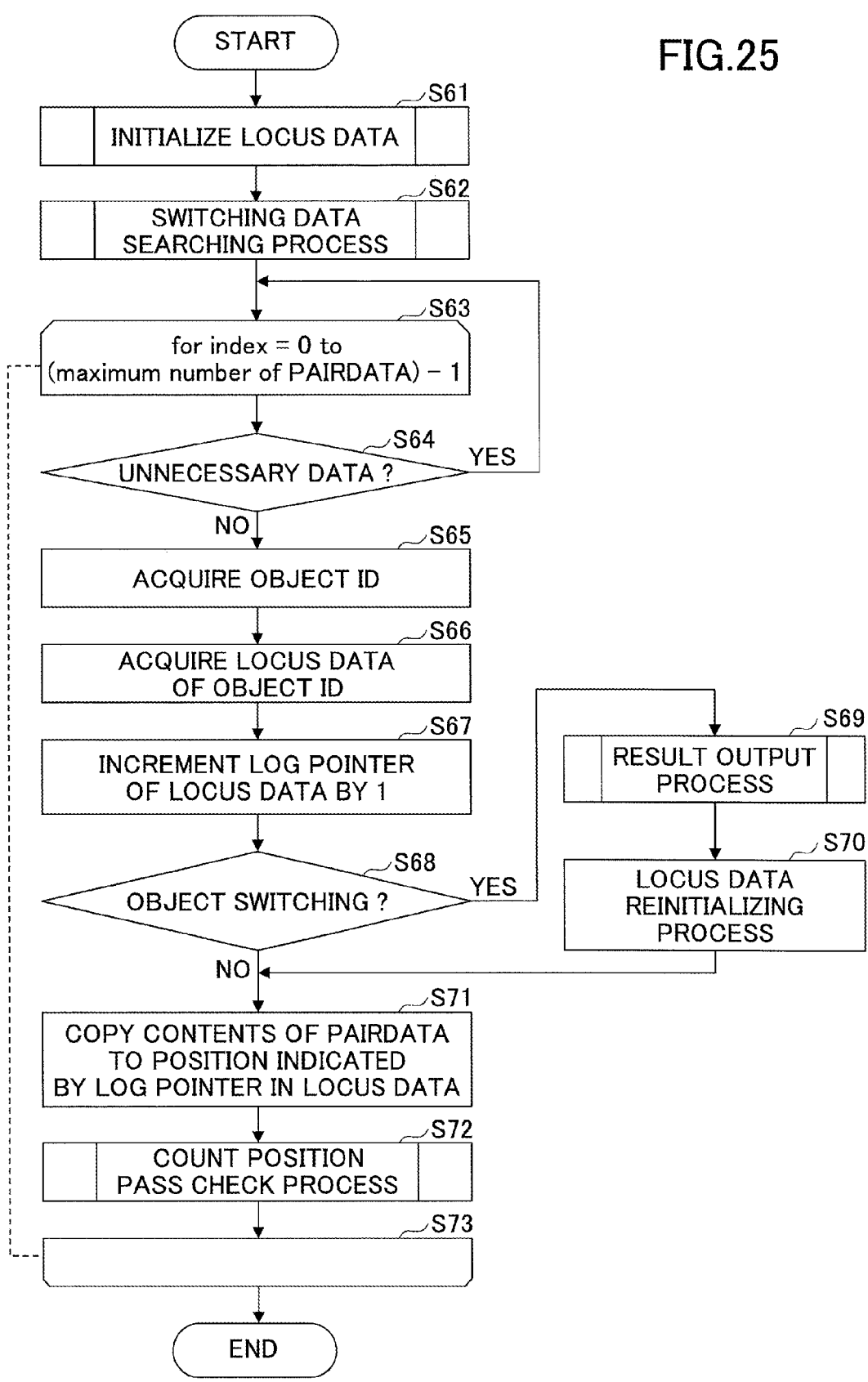
FIG. 25 is a flow chart for explaining an example of a process of a judging unit.

Next, a more detailed description will be given of the judging unit 23 illustrated in FIG. 2, by referring to FIGS. 25 through 29. FIG. 25 is a flow chart for explaining an example of the process of the judging unit 23.

In FIG. 25, the judging unit 23, in step S61, initializes locus data OBJECT_HISTORY stored in the storage unit 132. The judging unit 23, in step S62, performs a switching data searching process to be described later, in order to perform a result output process and a reinitializing process. The locus data OBJECT_HISTORY stores, in an array, the traveling locus of the vehicle tracked in the manner described above, from a first detection time to a most recent detection time of the vehicle, and the PAIRDATA structure also exists as a member of the locus data OBJECT_HISTORY. The processes of steps S61 and S62 are performed when starting the program.

Figure 26:
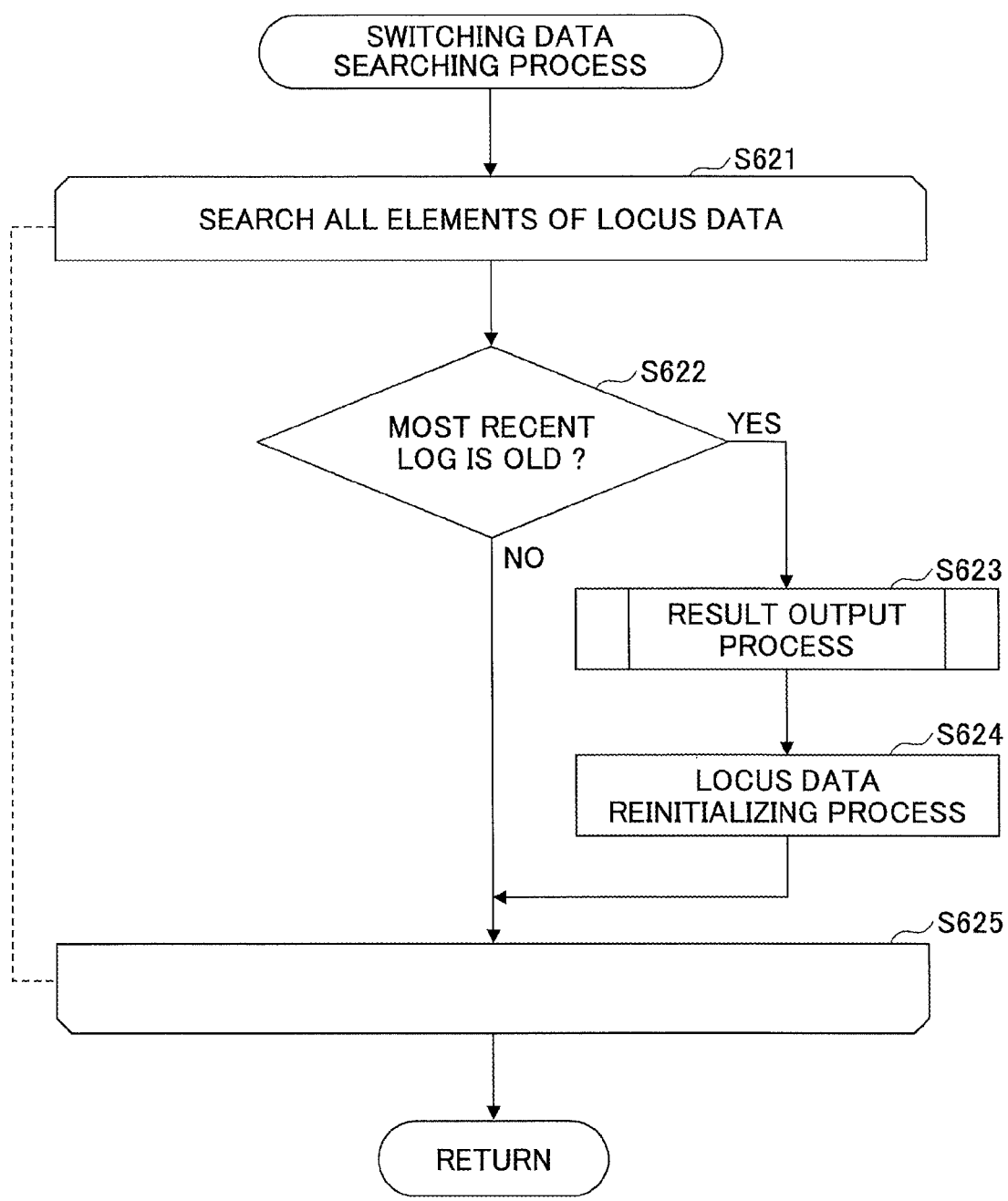
FIG. 26 is a flow chart for explaining an example of a switching data searching process.

FIG. 26 is a flow chart for explaining an example of the switching data searching process of step S62. In FIG. 26, the judging unit 23, in step S621, searches all of the members of the locus data OBJECT_HISTORY. The judging unit 23, in step S622, judges whether the most recent locus data OBJECT_HISTORY is older than a predetermined time. The predetermined time may be on the order of several seconds to approximately 10 seconds, for example. When the judgment result in step S622 is YES, the judging unit 23, in step S623, performs the result output process. In addition, the judging unit 23, in step S624, performs the reinitializing process. The result output process of step S623 and the reinitializing process of step S624 are the same as the processes of steps S69 and S70 illustrated in FIG. 25, and a description thereof will be given later. When the judgment result in step S622 is NO, or after step S624, the process advances to step S625. The judging unit 23, in step S625, repeats the processes of steps S621 through 624 until the search with respect to all of the members of the locus data OBJECT_HISTORY ends, and the process advances to step S63 illustrated in FIG. 25 after step S625.

The judging unit 23, in step S63, acquires the detection data PAIRDATA for indexes index=0 to {(maximum number of PAIRDATA)−1}. The judging unit 23, in step S64, judges whether unnecessary data exist, and the process returns to step S63 after discarding the unnecessary data when the judgment result is YES. The unnecessary data for the case in which the number of vehicles is counted include the data of the vehicle that is stationary and having a zero (0) traveling velocity, because the data of the stationary vehicle may be discarded in this case.

On the other hand, when the judgment result in step S64 is NO, the judging unit 23, in step S65, acquires the object ID of the vehicle indicated by the detection data PAIRDATA. The judging unit 23, in step S66, acquires the locus data OBJECT_HISTORY of the acquired object ID from the storage unit 132. The judging unit 23, in step S67, increments a log pointer of the locus data OBJECT_HISTORY by "1". The judging unit 23, in step S68, judges whether an object switching exists, and the process advances to step S69 when the judgment result is YES, and the process advances to step S71 when the judgment result is NO. For example, it may be judged that the object switching exists in a case in which a difference greater than or equal to a threshold value exists with respect to the time, position, or the like between the most recent data and the previous log data. Hence, the process of step S68 can judge whether the data of the vehicle that is previously tracked has discontinued, and the object ID identical to that of the vehicle previously tracked is being reused for another vehicle that is presently being tracked.

Figure 27:
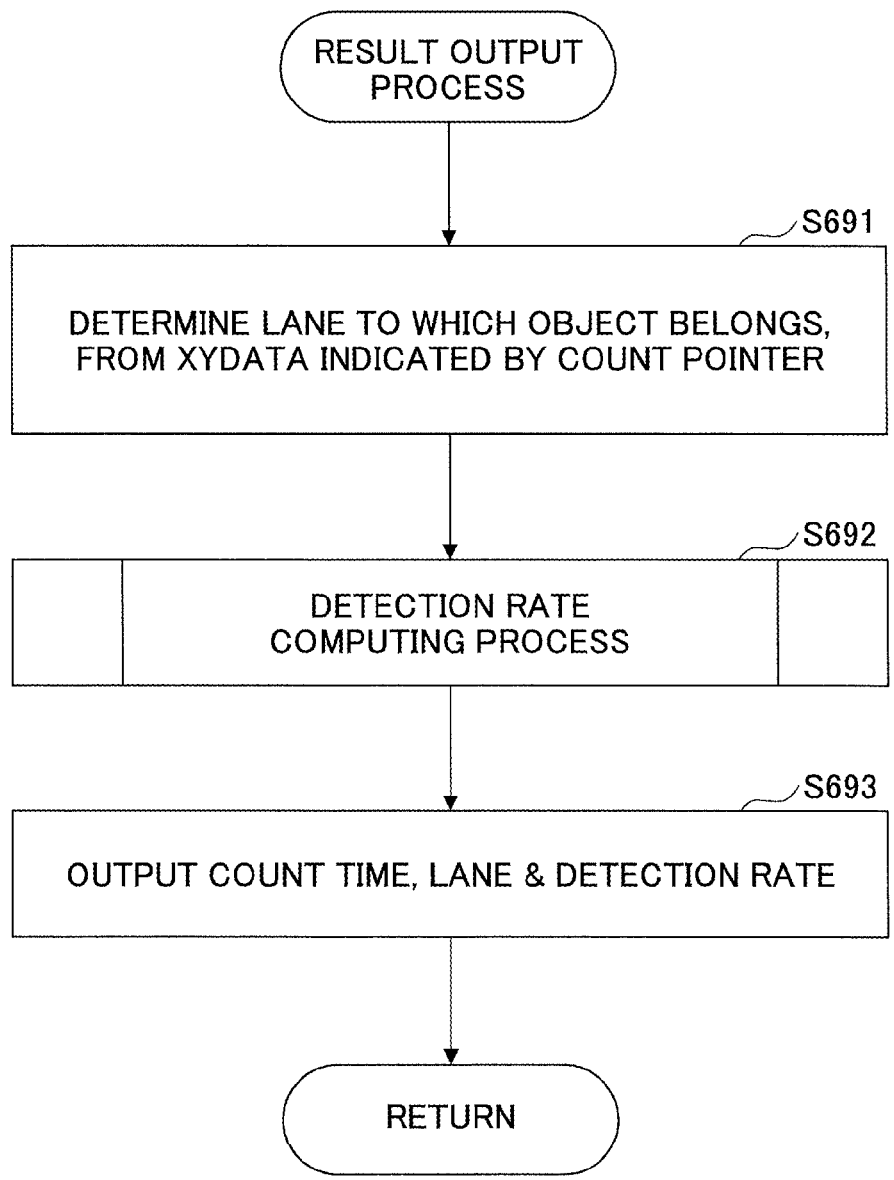
FIG. 27 is a flow chart for explaining an example of a result output process.

The judging unit 23, in step S69, performs the result output process of FIG. 27. FIG. 27 is a flow chart for explaining an example of the result output process. In FIG. 27, the judging unit 23, in step S691, determines the lane to which the object belongs from data XYDATA indicated by a count pointer. In a case in which the detection data PAIRDATA is already counted, the time at which the count is made is set in the count pointer. The value of the count pointer after initialization is "0", and the value of the count pointer after reinitialization is "0". The data XYDATA is obtained by rotating the detection data PAIRDATA in order to convert the coordinate system of the detection data PAIRDATA into an XY coordinate system on the road, and this rotating is similar to that described above in conjunction with FIGS. 13 and 14. For example, the judging unit 23, in step S691, may compare the XY coordinate values of the data XYDATA on the road at the time indicated by the count pointer, and the XY coordinate values of the known boundaries of the lanes on the road, in order to determine the lane to which the object belongs. The values of the data PAIRDATA and the data XYDATA after the initialization respectively depend on the processing system. On the other hand, the data PAIRDATA and the data XYDATA are not initialized by the reinitialization.

Figure 28:
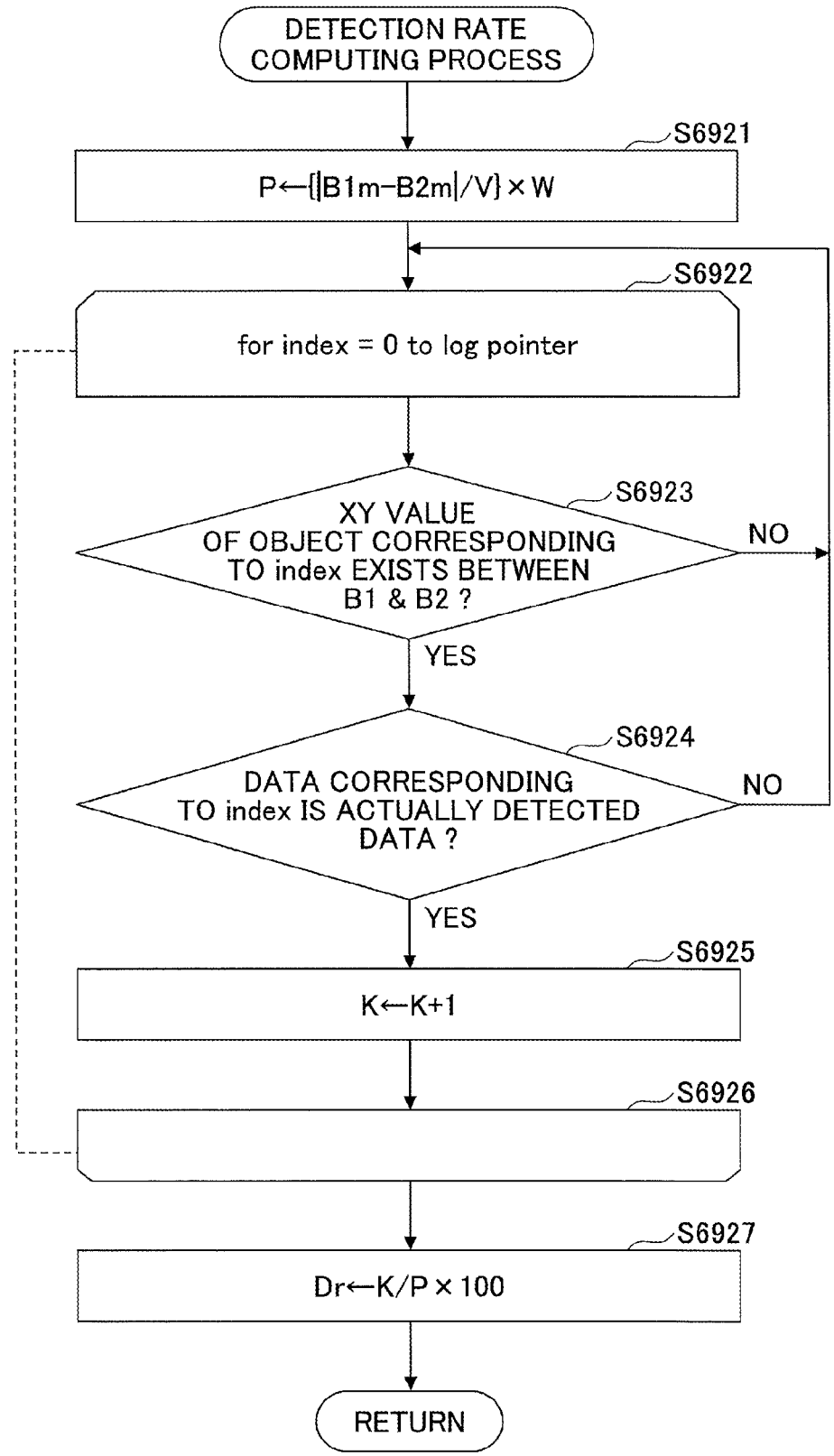
FIG. 28 is a flow chart for explaining an example of a detection rate computing process.

The judging unit 23, in step S692, performs a detection rate computing process illustrated in FIG. 28. FIG. 28 is a flow chart for explaining an example of the detection rate computing process. In FIG. 28, the judging unit 23, in step S6921, obtains the parameter P from $\{|B1m-B2m|/V\} \times 100$. The judging unit 23, in step S6922, performs processes of step S6923 and subsequent steps for the indexes index=0 to {log pointer}. The log pointer indicates the position of the most recent data XYDATA within the storage unit 132, or the position of a record. The value of the log pointer after the initialization is "0", and the value of the log pointer after the reinitialization is "0". The judging unit 23, in step S6923, judges whether the XY coordinate values of the object corresponding to the "index" is located between the detection boundaries B1 and B2, that is, within the detection range DR defined by the detection boundaries B1 and B2, and the process returns to step S6922 when the judgment result is NO. When the judgment result in step S6923 is YES, the judging unit 23, in step S6924, judges whether the data of the object corresponding to the "index" is the actual detection data that is actually detected, and the process returns to step S6922 when the judgment result is NO. When the judgment result in step S6924 is YES, the judging unit 23, in step S6925, increments K to K=K+1, and the process advances to step S6926. The judging unit 23, in step S6926, repeats the processes of steps S6922 through S6925 for the indexes index=- to {log pointer}. The judging unit 23, in step S6927, computes the vehicle detection rate Dr from Dr=(K/P)×100, and the process advances to step S693 illustrated in FIG. 27.

Returning now to the description of the result output process illustrated in FIG. 27, the judging unit 23, in step S693, outputs the count time, the lane that is determined, and the computed vehicle detection rate Dr, and the process advances to step S70 illustrated in FIG. 25. In a case in which the detection data PAIRDATA is already counted, the time when the count is made is set as the count time. The value of the count time after the initialization is "0", and the value of the count time after the reinitialization is "0".

Returning now to the description of the process illustrated in FIG. 25, the judging unit 23, in step S70, performs a reinitializing process on the locus data OBJECT_HISTORY. When the judgment result in step S68 is NO, or after step S70, the judging unit 23, in step S71, copies contents of the detection data PAIRDATA to the position indicated by the log pointer in the locus data OBJECT_HISTORY. The judging unit 23, in step S72, performs a count position pass check process illustrated in FIG. 29. The judging unit 23, in step S73, repeats the processes of steps S63 through S72 for the indexes index=0 to {(maximum number of PAIRDATA)−1}, and the process thereafter ends.

FIG. 29 is a flow chart for explaining an example of the count position pass check process. In FIG. 29, the judging unit 23, in step S721, performs a rotation process with respect to the detection results represented by the relative coordinate values of the polar coordinate system of the radar apparatus 1, in order to convert the coordinate values into the coordinate values if the XY coordinate system on the road according to the road configuration or the like. The judging unit 23, in step S722, stores the XY coordinate values obtained by the rotation process of step S721, to the position indicated by the log pointer in the XY coordinate array of the locus data OBJECT_HISTORY. The judging unit 23, in step S723, judges whether the count pointer is "0", and the process advances to step S73 illustrated in FIG. 25 when the judgment result is NO. The process of step S723 is performed in order to prevent the same vehicle from being counted twice within the detection range DR when the time of the count is set to the count pointer.

When the judgment result in step S723 is YES, the judging unit 23, in step S724, judges whether the log pointer is "0", and the process advances to step S73 illustrated in FIG. 25 when the judgment result is YES. On the other hand, when the judgment result in step S724 is NO, the judging unit 23, in step S725 acquires the previous count position from the storage unit 132. The judging unit 23, in step S726, judges whether {(previous count position)+JP}×{(present count position)−JP}<=0, and the process advances to step S73 illustrated in FIG. 25 when the judgment result is NO. That is, the process of step S726 judges whether the object traversed the count and lane judging position JP. When the judgment result in step S726 is YES, it can be judged that the object traversed the count and lane judging position JP. When the judgment result in step S726 is YES, the judging unit 23, in step S727, stores the present count pointer as the count pointer. The judging unit 23, in step S728, stores the present count time as the count time. After step S728, the process advances to step S73 illustrated in FIG. 25.

FIGS. 30A and 30B are diagram for explaining a difference between detection ranges of the standard-sized vehicle and the large-sized vehicle. In FIGS. 30A and 30B, those parts that are the same as those corresponding parts in FIG. 19 are designated by the same reference numerals, and a description thereof will be omitted. FIG. 30A illustrates a detectable range DR-1 of the radar apparatus 1 with respect to a medium-sized vehicle 106-1, and FIG. 30B illustrates a detectable range DR-2 of the radar apparatus 1 with respect to a large-sized vehicle 106-2. The detectable range DR-1 with respect to the medium-sized vehicle 106-1 illustrated in FIG. 30A is narrower than the detectable range DR-2 with respect to the large-sized vehicle 106-2 illustrated in FIG. 30B, and the medium-sized vehicle 106-1 cannot be detected at a vehicle position 106-1A. Hence, when the medium-sized vehicle 106-1 cannot be detected at the vehicle position 106-1A, data are interpolated using the data estimated by the tracking process described above. In this embodiment, by utilizing a range in which a blind (or dead) spot is generated within the vehicle detectable range according to the size of the vehicle, it is possible to measure the size of the vehicle detected by the radar apparatus 1.

Accordingly, at an ending part of the detectable range DR-2 (that is, a part of the detectable range DR-2 close to the radar apparatus 1), the estimation flag "flag" of the detection data of the large-sized vehicle 106-2 is "0", indicating that the detection data are the actually detected data, and thus, it can be judged that the detected vehicle is the large-sized vehicle 106-2. On the other hand, at an ending part of the detectable range DR-2, the estimation flag "flag" of the detection data of the medium-sized vehicle 106-1 at the vehicle position 106-1A is "1", indicating that the detection data are the data interpolated by the interpolation process, and thus, it can be judged that the detected vehicle is not the large-sized vehicle 106-2, that is, that the detected vehicle is the medium-sized vehicle 106-1.

In FIGS. 30A and 30B, the scanning range of the radar apparatus 1 is indicated as a region defined (or partitioned) by straight lines, however, the boundaries of the actual scanning range are not defined by straight lines. This is because, when the transmission wave from the radar apparatus 1 is viewed in a cross section perpendicular to a transmission axis, the transmission wave displays a profile in which the intensity (or strength) gradually decreases in a direction further away from the center of the scanning range. Generally, a beam width of the transmission wave of the radar apparatus 1 is represented by a half-width value with reference to a center peak. For this reason, the electromagnetic wave does not immediately cease to exist when the boundary is exceeded, and the reception state of the reflected wave may vary depending on the reflectivity of the object that reflects the transmission wave, the sensitivity of the receiving antenna, or the like.

Accordingly, even in a case in which a vehicle exists within the detectable range DR-1 or DR-2 at a position viewable from the radar position 1, a phenomenon in which the vehicle is detected at one point in time and the vehicle is not detected at another point in time may occur, as the position of the vehicle becomes closer to an edge (or peripheral) part of the detectable range DR-1 or DR-2. Furthermore, in actual circumstances, the vehicle detection may be affected by an occlusion caused by another vehicle at the edge part of the detectable range DR-1 or DR-2 at the far-end side from the radar apparatus 1. For this reason, the difference in the distances from the radar apparatus 1 between the detectable ranges DR-2 and DR-1 are in many cases not as significant as illustrated in FIGS. 33A and 33B, and depending on the setup condition of the radar apparatus 1 and the amount of traffic, it may be difficult to judge whether the vehicle is the large-sized vehicle or the medium-sized vehicle simply from the distance of the detectable range from the radar apparatus 1.

The embodiment described above can thus measure the size of the vehicle using a simple configuration.

According to the disclosed traffic flow measuring apparatus, traffic flow measuring method, and computer-readable storage medium, the size of the traveling vehicle can be measured by a simple configuration using a single radar apparatus. In addition, it is possible to count the number of traveling vehicles using the radar apparatus, and it is possible to count the number of vehicles in each lane of the road. For this reason, the traffic flow measuring apparatus can count the number of large-sized or medium-sized vehicles traveling in each lane, for example, and a multi-function traffic monitoring system can be provided at a low cost when the traffic flow measuring apparatus is applied to the traffic monitoring system. In addition, because of the simple configuration using the single radar apparatus, the maintenance costs of the traffic flow measuring apparatus and the traffic monitoring system can be suppressed. The disclosed traffic flow measuring apparatus, traffic flow measuring method, and computer-readable storage medium are suited for a traffic counter, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A traffic flow measuring apparatus comprising:
    a storage unit configured to store a program; and
    a processor configured to execute the program and perform a process including
        judging a size of a vehicle depending on a number of times a reflected wave from the vehicle is detected within a detection time with respect to a transmission wave transmitted from a radar apparatus to the vehicle, wherein the detection time is set according to the detected reflected wave.

2. The traffic flow measuring apparatus as claimed in claim 1, wherein the process further includes
    estimating an estimated position where the vehicle is likely to be detected after a predetermined time, based on a detected position of the vehicle detected from the reflected wave from the vehicle with respect to the transmission wave,
    storing the detected position and the estimated position in a distinguishable manner within the storage unit, in correspondence with the vehicle, and
    judging whether a size of the vehicle is greater than a predetermined size, based on a proportion of a number of estimated positions stored in the storage unit with respect to a sum of a number of the estimated positions and a number of the detected positions stored in the storage unit in correspondence with the vehicle.

3. The traffic flow measuring apparatus as claimed in claim 1, wherein the process further includes tracking a traveling locus of the vehicle, computing a vehicle detection rate Dr from Dr=(K/Pa)×100, and judging that the size of the vehicle is greater than or equal to a predetermined size when the vehicle detection rate Dr exceeds a threshold value, where K denotes a count value of a number of times the vehicle is counted at an actual sample position within a detection range DR defined by a first detection boundary B1 and a second detection boundary B2 that are perpendicular to lanes, and Pa denotes a number of traveling loci of vehicles tracked within the detection range DR.

4. The traffic flow measuring apparatus as claimed in claim 1, wherein the process further includes computing a vehicle detection rate Dr from Dr=(K/P)×100, and judging that the size of the vehicle is greater than or equal to a predetermined size when the vehicle detection rate Dr exceeds a threshold value, where K denotes a count value of a number of times the vehicle is detected at an actual sample position within a detection range DR defined by a first detection boundary B1 and a second detection boundary B2 that are perpendicular to lanes, and P denotes a parameter represented by a formula P={|B1m−B2m|/V}×W, where B1m denotes a horizontal distance from the radar apparatus to the detection boundary B1, B2m denotes a horizontal distance from the radar apparatus to the detection boundary B2, W denotes a number of times a measurement is made per unit time, and V denotes a velocity of the vehicle within the detection range DR.

5. The traffic flow measuring apparatus as claimed in claim 4, wherein the process further includes counting a number of vehicles passing a judging position perpendicular to the lanes, tracking a traveling locus of each vehicle, and judging a lane, having known coordinates, on which each vehicle is located at a point in time when each vehicle passes the judging position.

6. The traffic flow measuring apparatus as claimed in claim 5, wherein the process further includes performing the counting the number of vehicles and the judging the size of the vehicle, for each lane that is judged by the judging the lane.

7. A traffic flow measuring method comprising:

transmitting a transmission wave from a radar apparatus and receiving by the radar apparatus a reflected wave from a vehicle with respect to the transmission wave; and first judging a size of the vehicle, by a processor of the radar apparatus, depending on a number of times the reflected wave from the vehicle is detected within a detection time, wherein the detection time is set according to the detected reflected wave.

8. The traffic flow measuring method as claimed in claim 7, further comprising:

estimating, by the processor, an estimated position where the vehicle is likely to be detected after a predetermined time, based on a detected position of the vehicle detected from the reflected wave from the vehicle with respect to the transmission wave, and storing, by the processor, the detected position and the estimated position in a distinguishable manner within a storage unit, in correspondence with the vehicle, wherein the first judging judges whether a size of the vehicle is greater than a predetermined size, based on a proportion of a number of estimated positions stored in the storage unit with respect to a sum of a number of the estimated positions and a number of the detected positions stored in the storage unit in correspondence with the vehicle.

9. The traffic flow measuring method as claimed in claim 7, wherein the first judging tracks a traveling locus of the vehicle, computes a vehicle detection rate Dr from Dr=(K/Pa)×100, and judges that the size of the vehicle is greater than or equal to a predetermined size when the vehicle detection rate Dr exceeds a threshold value, where K denotes a count value of a number of times the vehicle is counted at an actual sample position within a detection range DR defined by a first detection boundary B1 and a second detection boundary B2 that are perpendicular to lanes, and Pa denotes a number of traveling loci of vehicles tracked within the detection range DR.

10. The traffic flow measuring method as claimed in claim 7, wherein the first judging computes a vehicle detection rate Dr from Dr=(K/P)×100, and judges that the size of the vehicle is greater than or equal to a predetermined size when the vehicle detection rate Dr exceeds a threshold value, where K denotes a count value of a number of times the vehicle is detected at an actual sample position within a detection range DR defined by a first detection boundary B1 and a second detection boundary B2 that are perpendicular to lanes, and P denotes a parameter represented by a formula P={|B1m−B2m|/V}×W, where B1nn denotes a horizontal distance from the radar apparatus to the detection boundary B1, B2m denotes a horizontal distance from the radar apparatus to the detection boundary B2, W denotes a number of times a measurement is made per unit time, and V denotes a velocity of the vehicle within the detection range DR.

11. The traffic flow measuring method as claimed in claim 10, wherein the first judging includes counting, by the processor, a number of vehicles passing a judging position perpendicular to the lanes, tracking, by the processor, a traveling locus of each vehicle, and second judging, by the processor, a lane, having known coordinates, on which each vehicle is located at a point in time when each vehicle passes the judging position.

12. The traffic flow measuring method as claimed in claim 11, wherein the first judging counts the number of vehicles by the counting and judges the size of the vehicle, for each lane judged by the second judging.

13. A non-transitory computer-readable storage medium having stored therein a program for causing a computer to execute a process comprising:

transmitting a transmission wave from a radar apparatus and receiving a reflected wave from a vehicle with respect to the transmission wave; and judging a size of the vehicle depending on a number of times the reflected wave from the vehicle is detected within a detection time, wherein the detection time is set according to the detected reflected wave.

14. The non-transitory computer-readable storage medium as claimed in claim 13, wherein the process further comprises:

estimating an estimated position where the vehicle is likely to be detected after a predetermined time, based on a detected position of the vehicle detected from the reflected wave from the vehicle with respect to the transmission wave; and storing the detected position and the estimated position in a distinguishable manner within a storage unit, in correspondence with the vehicle, wherein the judging judges whether a size of the vehicle is greater than a predetermined size, based on a proportion of a number of estimated positions stored in the storage unit with respect to a sum of a number of the estimated positions and a number of the detected positions stored in the storage unit in correspondence with the vehicle.

15. The non-transitory computer-readable storage medium as claimed in claim 13, wherein the judging tracks a traveling locus of the vehicle, computes a vehicle detection rate Dr from $Dr=(K/Pa) \times 100$, and judges that the size of the vehicle is greater than or equal to a predetermined size when the vehicle detection rate Dr exceeds a threshold value, where K denotes a count value of a number of times the vehicle is counted at an actual sample position within a detection range DR defined by a first detection boundary B1 and a second detection boundary B2 that are perpendicular to lanes, and Pa denotes a number of traveling loci of vehicles tracked within the detection range DR.

16. The non-transitory computer-readable storage medium as claimed in claim 13, wherein the judging computes a vehicle detection rate Dr from $Dr=(K/P) \times 100$, and judges that the size of the vehicle is greater than or equal to a predetermined size when the vehicle detection rate Dr exceeds a threshold value, where K denotes a count value of a number of times the vehicle is detected at an actual sample position within a detection range DR defined by a first detection boundary B1 and a second detection boundary B2 that are perpendicular to lanes, and P denotes a parameter represented by a formula $P=\{|B1m-B2m|/V\} \times W$, where B1nn denotes a horizontal distance from the radar apparatus to the detection boundary B1, B2m denotes a horizontal distance from the radar apparatus to the detection boundary B2, W denotes a number of times a measurement is made per unit time, and V denotes a velocity of the vehicle within the detection range DR.

17. The non-transitory computer-readable storage medium as claimed in claim 16, wherein the judging includes
counting a number of vehicles passing a judging position perpendicular to the lanes, and
tracking a traveling locus of each vehicle, and judging a lane, having known coordinates, on which each vehicle is located at a point in time when each vehicle passes the judging position.

18. The non-transitory computer-readable storage medium as claimed in claim 17, wherein the judging counts the number of vehicles by the counting and judges the size of the vehicle, for each lane judged by the judging the lane.

19. The traffic flow measuring apparatus as claimed in claim 1, wherein the process further includes
counting a number of vehicles passing a judging position on a lane according to the size of the vehicle judged by the judging.

20. The non-transitory computer-readable storage medium as claimed in claim 13, wherein the process further comprises:
counting a number of vehicles passing a judging position on a lane according to the size of the vehicle judged by the judging.

* * * * *